United States Patent
Chakrapani Rangarajan et al.

(10) Patent No.: US 11,349,708 B2
(45) Date of Patent: May 31, 2022

(54) CONFIGURATION GENERATION FOR VIRTUAL NETWORK FUNCTIONS (VNFS) WITH REQUESTED SERVICE AVAILABILITY

(71) Applicants: Pradheba Chakrapani Rangarajan, Montreal (CA); Maria Toeroe, Montreal (CA)

(72) Inventors: Pradheba Chakrapani Rangarajan, Montreal (CA); Maria Toeroe, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 173 days.

(21) Appl. No.: 16/488,539

(22) PCT Filed: Dec. 14, 2017

(86) PCT No.: PCT/IB2017/057955
§ 371 (c)(1),
(2) Date: Aug. 23, 2019

(87) PCT Pub. No.: WO2018/162970
PCT Pub. Date: Sep. 13, 2018

(65) Prior Publication Data
US 2021/0144056 A1  May 13, 2021

Related U.S. Application Data

(60) Provisional application No. 62/469,088, filed on Mar. 9, 2017.

(51) Int. Cl.
*H04L 41/0806* (2022.01)
*H04L 41/5009* (2022.01)
(Continued)

(52) U.S. Cl.
CPC ...... *H04L 41/0806* (2013.01); *H04L 41/5012* (2013.01); *H04L 41/5019* (2013.01); *H04L 41/5045* (2013.01)

(58) Field of Classification Search
CPC ............. H04L 41/0806; H04L 41/5012; H04L 41/5019; H04L 41/5045; H04L 41/50;
(Continued)

(56) References Cited

U.S. PATENT DOCUMENTS 9,806,979 B1 * 10/2017 Felstaine ............. H04L 41/0893
2016/0095032 A1 * 3/2016 Varney ................. H04W 24/02
370/329

(Continued)

FOREIGN PATENT DOCUMENTS

WO  2015/140678 A1  9/2015
WO  WO-2015140678 A1 * 9/2015 .......... G06F 11/0706

OTHER PUBLICATIONS

Jahanbanifar, Azadeh: "A Model-based Framework for System Configuration Management"; Apr. 1, 2016; 159 pages.
(Continued)

*Primary Examiner* — Joseph L Greene
(74) *Attorney, Agent, or Firm* — Ericsson Canada Inc.

(57) ABSTRACT

A Virtual Network Function (VNF) is provided for deployment in a Network Function Virtualization Infrastructure (NFVI). First, an input is obtained that includes a description of available software components, configuration requirements specifying service types to be provided by the VNF, and infrastructure information specifying resources provided by the NFVI. The infrastructure information includes characteristics of virtual machines (VMs). For each service type, a VNF component (VNFC) configuration is generated. The generated VNFC configuration optimizes usage of the resources and satisfies requested service availability. A VNF
(Continued)

configuration is formed that includes a collection of VNFC configurations created for the service types. The VNF configuration is delivered to a Network Function Virtualization (NFV) system for the deployment of VNFC instances on the VMs thereby providing the VNF.

10 Claims, 10 Drawing Sheets

(51) Int. Cl.
  *H04L 41/5019* (2022.01)
  *H04L 41/5041* (2022.01)
(58) Field of Classification Search
  CPC .............................. H04L 41/0893; H04W 8/22; H04W 36/0033; H04W 36/0016; H04W 36/00837; H04W 88/18; H04W 24/02; H04W 24/04; H04W 16/18; G06F 9/5077; G06F 9/45533
  See application file for complete search history.

(56) References Cited

U.S. PATENT DOCUMENTS

| | | | |
|---|---|---|---|
| 2016/0150421 A1* | 5/2016 | Li | ....................... H04L 41/0816 370/235 |
| 2016/0269232 A1* | 9/2016 | Hikichi | ............... H04L 41/5041 |
| 2016/0328259 A1* | 11/2016 | Xia | ........................ H04L 63/102 |
| 2017/0250870 A1* | 8/2017 | Zhao | ........................ H04L 63/20 |
| 2017/0257276 A1* | 9/2017 | Chou | .................. H04L 41/0823 |
| 2018/0070262 A1* | 3/2018 | Nakano | .................. H04W 28/24 |
| 2019/0052549 A1* | 2/2019 | Duggal | .................. G06Q 30/04 |
| 2020/0044919 A1* | 2/2020 | Yao | ..................... H04L 41/0806 |
| 2020/0084096 A1* | 3/2020 | Lacey | ..................... H04L 41/20 |

OTHER PUBLICATIONS

Kanso et al.: "Generating AMF Configuralions from Software Vendor Constraints and User Requirements"; Mar. 16, 2009; 8 pages.

Mustafiz, Sadaf et al.: "A Network Service Design and Deployment Process for NFV Systems"; Oct. 31, 2016; 9 pages.

Chakrapani Rangarajan, Pradheba: "Design and Deployment of AMF Configurations in the Cloud" Apr. 1, 2017; 114 pages.

Chakrapani Rangarajan, Pradheba et al.: "Managing the Availability of VNFs with the Availability Management Framework"; Nov. 26, 2017; 4 pages.

SA Forum: "Application Interface Specification Platform Management Service"; Jan. 1, 2017; 84 pages.

ETSI GS NFV-IFA 011 V2.1.1: "Network Functions Virtualisation (NFV); Management and Orchestration; VNF Packaging Specification"; Oct. 2016; 53 pages.

* cited by examiner

Algorithm-1 Calculate the number of SIs per VM for a type stack
Input: No of SIs per VM from Equation (4), RA from CR
Output: No of SIs per VM 1  Begin
2  Initialize max to No of SIs per VM
3  Initialize min to one
4  Initialize RA from CR
5  Calculate number of entities and number of collocated entities using Algorithm-2 for min
6  Use availability estimate method to calculate EA for the number of collocated entities
7  if (EA < RA) then
8      Discard type stack
9      Break
10 else if (EA = RA) then
11     No of SIs per VM = min
12 else
13     No of SIs per VM = Call getNoOfSIsPerVM (max, min, RA)
14 end if
15 return No of SIs per VM
16 End
17 getNoOfSIsPerVM (max, min, RA)
18 Begin
19     Calculate number of entities, No of SIs per VM and number of collocated entities using Algorithm-2 for max
20     Update the max with No of SIs per VM
21     Use availability estimate method to calculate EA for the number of collocated entities
22     if (EA < RA) then
23         Initialize mean to (min + max)/2
24         Calculate number of entities, No of SIs per VM and number of collocated entities for mean
25         Update the mean with No of SIs per VM
26         Use availability estimate method to calculate EA for the number of collocated entities
27         if (EA < RA) then
28             max = mean
29             Call getNoOfSIsPerVM (max, min, RA)
30         else if (EA > RA) then
31             min = mean
32             Call getNoOfSIsPerVM (max, min, RA)
33         else
34             return mean
35         end if
36     else
37         return max
38     end if
39 End

FIG. 4

Alogorithm-2 Determine the number of entities and number of collocated entities for a type stack
Input: SUT, No of SIs per VM, Set of actual rec of CTs determined using {13},
Set of min no of comps determined using [5] and Set of max no of comps from ETF
Output: No of SIs per VM, No of SGs, No of VMs, No of PHs, No of SIs per PH,
No of coll comps per SU No of coll SUs, No of coll VMs

| | |
|---|---|
| 1 | Begin |
| 2 | Initialize Actual rec of CT to false |
| 3 | if (SUT is provided by the vendor and max no of comps is specified) then |
| 4 | if ( max no of comps in Set of max no of comps is lesser than min no of comps in Set of min no of comps) then |
| 5 | Discard type stack |
| 6 | Break |
| 7 | end if |
| 8 | end if |
| 9 | for each ct in Set of actual rec of CTs do |
| 10 | if (ct.Actual recovery is not equal to Component restart or Component failover) then |
| 11 | Actual rec of CT = true |
| 12 | end if |
| 13 | end for |
| 14 | if (Actual rec of CT is equal to true OR redundancy model is equal to No-redundancy ) then |
| 15 | No of SIs per SU = 1 |
| 16 | else |
| 17 | Calculate No of SIs per SU using Equation (5) |
| 18 | end if |
| 19 | Calculate the No of comps per SU using Equation(6-7) |
| 20 | for each ct in a SUT do |
| 21 | Calculate ct.No of SGs using Equation (8-24) and add it to the Set of no of SGs |
| 22 | end for |
| 23 | Calculate No of SGs by considering the max (Set of no of SGs) |
| 24 | Calculate the No of SIs per VM, No of VMs, No of PHs, No of SIs per PH, No of coll comps per SU, No of coll SUs, No of coll VMs using Equation (25-41) |
| 25 | Return No of SIs per VM, No of SGs, No of VMs, No of PHs, No of SIs per PH, No of coll comps per SU and No of coll SUs, No of coll VMs |
| 26 | End |

FIG. 5

CONFIGURATION GENERATION FOR VIRTUAL NETWORK FUNCTIONS (VNFS) WITH REQUESTED SERVICE AVAILABILITY

This application is a 35 U.S.C. § 371 national phase filing of International Application No. PCT/IB2017/057955, filed Dec. 14, 2017, which claims the benefit of U.S. Provisional Application No. 62/469088, filed Mar. 9, 2017, the disclosures of which are incorporated herein by reference in their entireties.

TECHNICAL FIELD

Embodiments of the disclosure relate to the configuration of virtual network functions.

BACKGROUND

With the growing popularity of Network Function Virtualization (NFV), the trend of deploying Network Services (NS) using the NFV Architecture is increasing. One goal of NFV is to automate the deployment and management of NS in a seamless manner. To provide a desired NS, one or more Virtualized Network Functions (VNFs) may be chained together. Each VNF is deployed on a cluster of VMs, which are hosted on the physical servers of the Network Functions Virtualization Infrastructure (NFVI).

NFV is changing the way NS are designed, deployed and managed. It leverages virtualization and cloud technologies to roll out NS faster as opposed to traditional networks. For this purpose, NFV unveils a new set of concepts called VNF, NFVI and NFV Management and Orchestration (NFV-MANO). VNFs are network functions that are virtualized and can run over shared compute, storage and networks in a NFVI. The NFVI encompasses heterogeneous physical hardware, software and networking elements necessary to run VNFs. NFV-MANO is responsible for managing the life cycle of the NS and its constituent VNFs.

A VNF may consist of a single software component capable of providing the network function or of several software components that collaborate to provide the network function. These software components are referred to as VNF Components (VNFCs). A VNFC Instance (VNFCI) represents the run-time instantiation of a VNFC. A VNF may instantiate more than one VNFCI of each VNFC. Each VNFCI runs in a VM of the NFVI and a VM may host only one VNFCI.

Virtualization allows a great deal of flexibility in how a VNF can be deployed as long as the parent network service fulfills the service level agreement (SLA), for example, with respect to service availability. As in traditional telecom, VNFs are expected to be highly available and provide the required functions with minimal downtime. The design of highly available VNFs is a challenging task. Including reliable software components does not guarantee that the VNFs can be highly available.

SUMMARY

In one embodiment, there is provided a method for providing a VNF for deployment in an NFVI. The method comprises obtaining an input including a description of available software components, configuration requirements specifying service types to be provided by the VNF, and infrastructure information specifying resources provided by the NFVI, the infrastructure information including characteristics of VMs. The method further comprises: generating, for each service type, a VNFC configuration that optimizes usage of the resources and satisfies requested service availability; forming a VNF configuration including a collection of VNFC configurations generated for the service types; and delivering the VNF configuration to a Network Function Virtualization (NFV) system for the deployment of VNFC instances on the VMs thereby providing the VNF.

In another embodiment, there is provided a network node comprising processing circuitry and memory. The memory contains instructions executable by the processing circuitry to provide a VNF for deployment in an NFVI. The network node is operative to obtain an input including a description of available software components, configuration requirements specifying service types to be provided by the VNF, and infrastructure information specifying resources provided by the NFVI, the infrastructure information including characteristics of VMs. The network node is further operative to: generate, for each service type, a VNFC configuration that optimizes usage of the resources and satisfies requested service availability; form a VNF configuration including a collection of VNFC configurations generated for the service types; and deliver the VNF configuration to an NFV system for the deployment of VNFC instances on the VMs thereby providing the VNF.

In yet another embodiment, there is provided a network node operable to provide a VNF for deployment in an NFVI. The network node comprises an input module adapted to obtain an input including a description of available software components, configuration requirements specifying service types to be provided by the VNF, and infrastructure information specifying resources provided by the NFVI, the infrastructure information including characteristics of VMs. The network node further comprises a VNFC configuration generation module adapted to generate, for each service type, a VNFC configuration that optimizes usage of the resources and satisfies requested service availability; a VNF configuration formation module adapted to form a VNF configuration including a collection of VNFC configurations generated for the service types; and a delivery module adapted to deliver the VNF configuration to an NFV system for the deployment of VNFC instances on the VMs thereby providing the VNF.

In yet another embodiment there is provided a method for providing a VNF for deployment in an NFVI. The method comprises initiating an instantiation of a server instance in a cloud computing environment which provides processing circuitry and memory for running the server instance. The server instance is operative to obtain an input including a description of available software components, configuration requirements specifying service types to be provided by the VNF, and infrastructure information specifying resources provided by the NFVI, the infrastructure information including characteristics of VMs. The server instance is further operative to: generate, for each service type, a VNFC configuration that optimizes usage of the resources and satisfies requested service availability; form a VNF configuration including a collection of VNFC configurations generated for the service types; and deliver the VNF configuration to an NFV system for the deployment of VNFC instances on the VMs thereby providing the VNF.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIG. 4 illustrates a first algorithm for calculating the number of service instances per VM for a type stack according to one embodiment.

FIG. 5 illustrates a second algorithm for determining the number of entities and the number of collocated entities for a type stack according to one embodiment.

DETAILED DESCRIPTION

Figure 1:
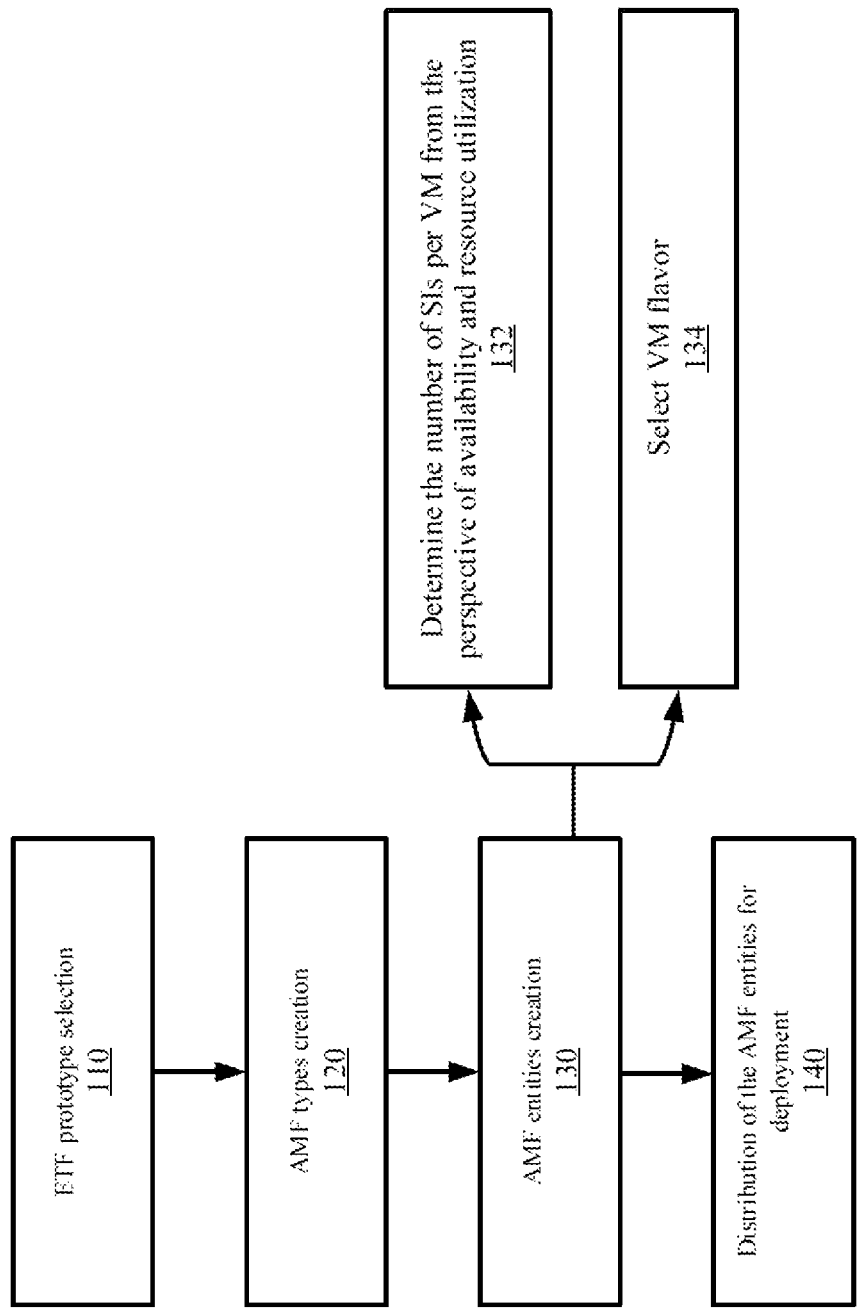
FIG. 1 is a flow diagram illustrating an outline of a configuration generation method for a VNF according to one embodiment.

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

A system and method for providing highly available VNF configurations are described. The design of the VNFs incorporates proper redundancy and recovery mechanisms to minimize service outage. In the event of failure, coordination among the redundant entities is vital for ensuring service continuity. The Service Availability (SA) Forum abstracts the availability mechanisms (i.e. managing the life cycle of application component instances, coordinating the redundant entities and executing the appropriate recovery mechanisms in the event of failure) into a framework called the Availability Management Framework (AMF). To manage the availability of services provided by a VNF, AMF may be used internally within the VNF which uses an AMF configuration to provide the information such as the number of component instances, the relation between them and their dependencies.

AMF manages the availability based on a configuration describing the services to be provided and the service provider entities that it needs to manage and coordinate. These provider entities are redundant to achieve the requested service availability level; however, the redundancy increases the number of resources needed. As a result, the problem of configuring a VNF, which runs as a set of AMF managed applications, becomes a tradeoff between availability and resource usage. An NFV service provider may like to select a VNF deployment that has the least resource usage yet fulfills the SLA.

Existing AMF configuration generation methods have been designed to meet a requested service availability when the AMF managed application is deployed in a cluster of physical hosts. When such a configuration is deployed in the NFVI, more deployment options become possible in the virtual environment on the one hand; on the other, the virtualization technology also contributes to failures and needs to be taken into account when estimating the availability provided by a configuration.

This disclosure describes the use of AMF as middleware to manage the availability of the services provided by VNFs; and accordingly, a method is proposed for the generation of AMF configurations for such VNFs. The disclosed method maps the NFV concepts to the AMF domain and designs VNF Components (VNFC) for a VNF. Furthermore, the disclosed method calculates the number of AMF entities as well as the number of VNFCIs for each VNFC from both availability and resource utilization perspective. From availability perspective, a goal is to meet the requested level of availability for each requested service. From resource perspective, a goal is to deploy the VNF using minimum resources, i.e. optimize resource utilization. Availability of a service depends on the availability of all the entities involved in providing the service and the interferences caused by the collocation of entities (for example collocated virtual machines (VMs)). To minimize such interference, the entities can be grouped into fault isolation units (for example physical hosts) in different ways, which in turn may increase the resources (e.g. number of physical hosts) needed. Therefore, the challenge is to calculate the number of entities in such a way that both availability and resource goals are satisfied. Once the at least one AMF configuration is generated, the configuration and deployment of the VNF in an NFVI, the number of VNFCIs, their affinity and anti-affinity relationship can be extracted from the AMF configurations.

The disclosure describes at least two aspects: 1) An availability estimation method that predicts the availability of a service by considering all the factors that affect its availability, including the interference due to collocation; 2) An approach to calculate the number of entities for meeting the requested level of availability and optimizing resource utilization.

Before describing the generation of VNF configurations, it is helpful to explain some terminologies used by AMF. The SA Forum has standardized a set of middleware services typically necessary for applications to achieve high availability. Among those middleware services, AMF has the responsibility of managing the availability of application services based on a configuration.

An AMF configuration consists of two groups of entities: the service provider entities and the service entities. The service provider entities are organized in a redundant manner so that the provided services are also protected. If any of the service provider entities actively providing a service fails, the service is failed over to a redundant service provider. The service providers include Components, Service Units (SUs), Service Groups (SGs) and AMF nodes whereas the service entities include Component Service Instances (CSIs) and Service Instances (SIs). The information about the service provider entities, their collocation/anti-collocation relation are described in the AMF configuration.

For AMF a component may represent a hardware or a software resource that provides a service. It is the smallest building block from which an AMF application is built. It is also the smallest fault-zone within an AMF managed system. A component starts providing a service only when a workload is assigned to it. AMF abstracts this workload unit as CSI. Components may collaborate to provide a desired service functionality. This tight collaboration may allow faults to propagate easily. For these reasons, components working together to provide a service are grouped into a logical unit called SU. This is the next fault-zone identified by AMF that can be isolated and repaired independently. Accordingly, from the service side, CSIs are composed into a higher level workload unit called SI. At run-time AMF assigns SIs to the SUs by assigning the CSIs of each SI to components of an SU.

To protect the service in spite of failures, redundant SUs work together and form a protection group called SG. These SGs follow one of the following redundancy models: 2N; N+M; N-way active; N-way; and No-redundancy redundancy models. Each SI is characterized by one or more active assignments and zero or more standby assignments that varies according to the redundancy model. Typically, one or more SGs form an AMF application.

AMF identifies the AMF node as the logical entity that is used to host the SUs. An AMF node may be mapped to a physical hardware or a VM. SGs are deployed over a group of AMF nodes which form the AMF cluster. AMF entities are typed, except for nodes and clusters. The common characteristics of AMF entities are captured in their respective types.

A configuration generation method was proposed in the U.S. patent application Ser. No. 15/122,099 with a national phase entry on Aug. 26, 2016, entitled "Availability-estimate Based Configuration Generation," for clustered applications and systems managed by the SA Forum AMF. This method (hereinafter referred to as the prior method) takes the Configuration Requirements (CR) and the extended version of the Entity Types Files (ETFs) as input. In the CR, a system designer describes the services to be provided, the cluster information (e.g. the number of physical hosts) and the required level of service availability. The standard portion of ETF describes the available software to provide the services, its deployment features and limitations, and the extensions describe the information characterizing the reliability of the software components. Based on the input, the prior method generates one or more AMF configurations that can satisfy the requested level of availability for the services requested in the CR.

The configuration generation method for VNFs (also referred to as the disclosed method) extends the prior method by taking into consideration the effect of deploying the configuration in a virtual environment and the interference of collocated entities. Due to collocation, the failure of one entity may impact the other entities hosted in the same environment, e.g. failure of a VM may result in the restart of the physical host and, therefore, impacting the services of all VMs hosted on the physical host. Moreover, in a virtual environment, different VM sizes can be used and, as a result, the cluster size and the collocation can vary. The choice of cluster size and collocation impact the availability of the services and the resource utilization, and results in a large number of configuration options. To address the effect of the underlying infrastructure and collocation, the disclosed method further extends the CR and the ETF for additional input.

FIG. 1 is a flow diagram illustrating an outline of the disclosed method in the form of a configuration generation process 100 for a VNF according to one embodiment. The process 100 includes four main steps: ETF prototype selection at step 110; AMF types creation at step 120; AMF entities creation at step 130; and distribution of the AMF entities for deployment at step 140. Step 130 may be further divided into two sub-steps, which include: determining the number of SIs per VM from the perspective of availability and resource utilization at step 132, and selecting the VM flavor at step 134, where a VM flavor specifies characteristics of the VMs that the NFVI provides as resources. For example, each VM flavor may specify the size and processing power of a set of resources, e.g. a medium VM flavor may have half of the virtual CPU cores, disk space and RAM of a large VM flavor.

Figure 2:
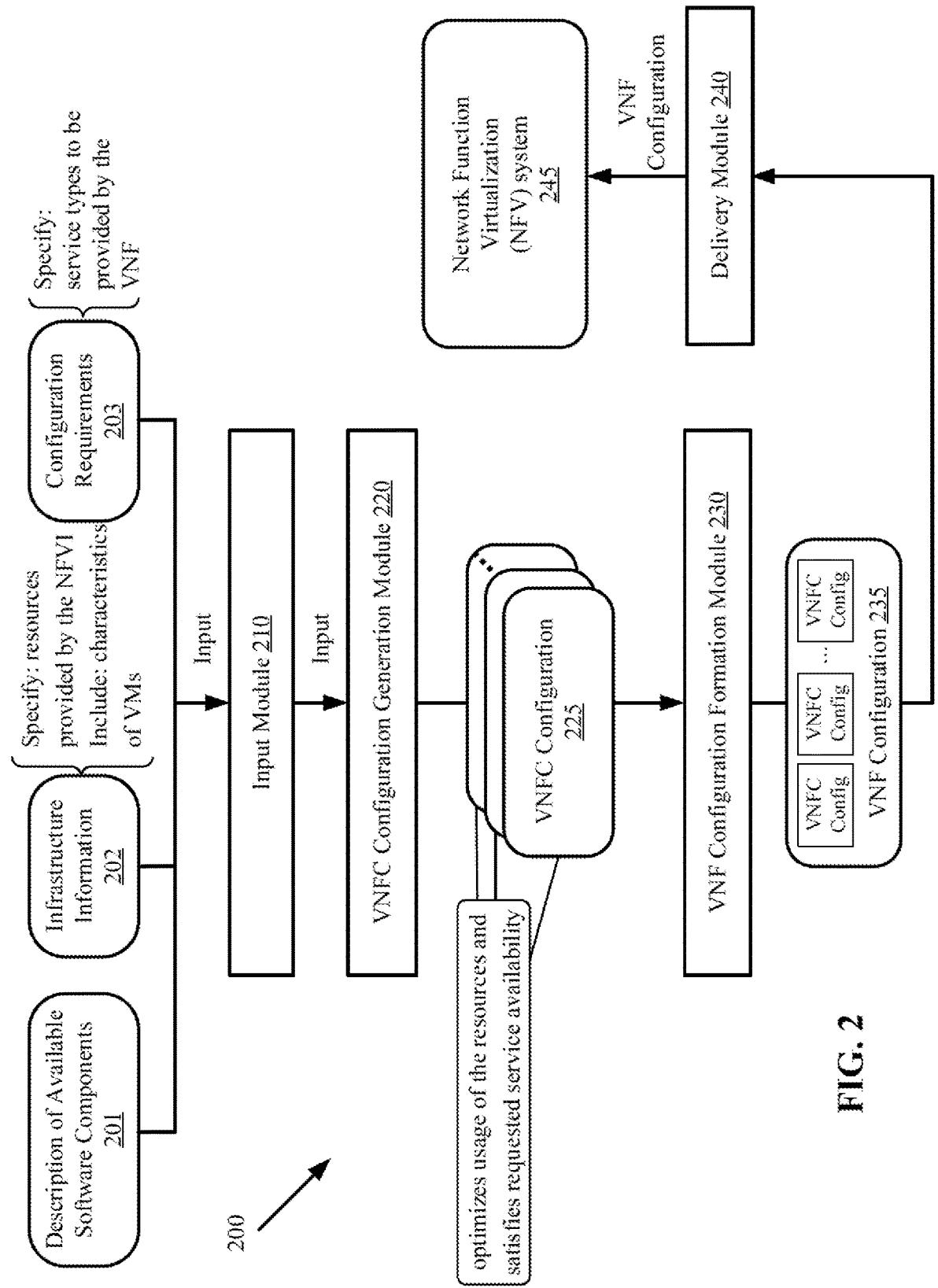
FIG. 2 is a diagram illustrating a method for providing a VNF according to one embodiment.

FIG. 2 is a diagram illustrating a method 200 for providing a VNF according to one embodiment. The method 200 begins with an input module 210 adapted or operative to obtain an input that includes a description of available software components 201, configuration requirements 202 specifying service types to be provided by the VNF, and infrastructure information 203 specifying resources provided by the NFVI. The infrastructure information 203 includes characteristics of VMs. The input is sent to a VNFC configuration generation module 220, which is adapted or operative to generate, for each service type requested in the VNF configuration requirements 202, a VNFC configuration 235 that optimizes usage of the resources and satisfies requested service availability. A VNF configuration formation module 230 is adapted or operative to form a VNF configuration 235, which includes a collection of VNFC configurations 225 generated for all of the requested service types. A delivery module 240 is adapted or operative to deliver the VNF configuration 235 to an NFV system 245, which deploys VNFCIs on the VMs thereby providing the VNF. In one embodiment, the infrastructure information 203 may specify VM flavors, capacity of the hosts, failure rates, and the like. Furthermore, the term "obtain" hereinafter refers to any one of the operations including "receiving," "fetching," "collecting," and the like. In one embodiment, the VNF containing the VNF configuration information is delivered to the NFV system run by an operator, such as the management and orchestration (MANO) part of the NFV system.

One goal of the disclosed method is to generate an optimal VNF configuration from the perspective of service availability and resource usage. The generated configuration provides the requested service availability while using the minimum necessary resources in terms of physical hosts.

With respect to the application running in VMs of the VNF, the disclosed method is described based on the SA Forum specification; however, it can be mapped to existing cloud platform technology e.g. Kubernetes and the like.

More specifically, a mapping may be established between the Kubernetes domain and the AMF domain. Kubernetes is an open-source platform for automating deployment, scaling, and operations of containers across clusters of hosts. The containers provide isolation of microservices in the cloud platform. Microservices are small applications that can be deployed independently, scaled independently and tested independently and have a single responsibility. Non-limiting examples of the mapping between Kubernetes and AMF may include: a container may be mapped to an AMF component; a pod (i.e. a collection of containers) may be mapped to an SU; a selector may be mapped to an SI, a target port may be mapped to a CSI; and a replica set may be mapped to an SG with the N-way active redundancy model. Thus, the Kubernetes containers and pods may be deployed in VMs similar to the AMF components and SUs. That is, the disclosed method may be used to generate VNF configurations based on a cloud platform technology such as Kubernetes instead of AMF.

For the generation of VNF configurations, the CR is extended with the characterization of the virtual infrastructure, such as the VM flavors, the hypervisor, the guest and host operating systems (OSs) and the physical hosts from reliability, capacity and resource usage perspective. Part of this information, e.g. VM flavors, is already considered in the VNF Descriptor (VNFD) which is provided by VNF vendors together with the VNF software package according to the European Telecommunications Standards Institute (ETSI) NFV specifications.

The AMF components also have capacity limitations in providing their services, which is described in their respective ETFs, i.e. the number of CSIs that a component type can support simultaneously in the active and/or standby state. Moreover, an SU may have a limit on how many component instances can be grouped together. SUs are organized into service groups according to a redundancy model, which may be prescribed by the vendor or requested in the CR. For the purpose of configuration generation, the ETF is further extended at least to characterize the resource needs of a component to provide a CSI in the active state.

Note that a component may not need the same amount of resources to support the standby state of a CSI as for the active state. However, in this disclosure the resource needs of the two states are not distinguished, as a component in the standby role will be able to take over the active role only if it has the resources needed for the active role. Thus, the resource needs of the active role are used for all calculations.

Considering these extensions, the disclosed method first selects, from the available software components (i.e. component types in AMF terms) described in the ETFs, those that are capable of providing the requested service types. These component types are grouped into type stacks. These type stacks are completed and transformed into AMF type stacks, each of which is a candidate for providing one type of service with the requested service availability based on the reliability figures associated with the components in the type stack. For each requested service type, multiple AMF type stacks may be created.

Up to this point the availability estimation is made with the assumption that there is at least one instance of each component type in the configuration. However, this single instance may not be enough considering the component type's capacity and the volume of the service requested. The service volume in these calculations is characterized by the number of SIs that needs to be provided for each service type. That is, each SI represents a unit of a service type and the CR gives, for each service type, the number of SIs to be provided. An SI may be composed of one or more CSIs of the same or different types, each of which can be provided by one component instance of the same or different component types depending on the capabilities of the given component in the type stack in question.

According to the NFV specifications, a VNF can be composed of one or more VNFCs, each providing a different functionality and each of which may have different numbers of instances running in a deployment configuration. A VNFC instance is hosted on a VM and each VM can host only one VNFC instance. Therefore, the AMF service type can be mapped to the VNFC functionality, the AMF types stack can be mapped to the VNFC at the type level, and the VNFC instance can be mapped to an AMF node providing one type of service and therefore hosting SUs of the same type. A complete configuration may include the configuration of AMF entities (i.e. SUs and their components) within a VNFC instance and the number of VNFC instances (i.e. AMF nodes) that are needed to provide the requested volume of the service with the requested availability.

In one embodiment, the AMF configuration is generated for each requested service type, and a VNFC is configured for the service type so that the VNFC can provide the requested number of SIs with the requested availability. From the generated configurations capable of providing the service with the requested availability, an AMF configuration using the least resources in terms of physical hosts is selected.

The CR defines the services and/or functionalities that a VNF is to provide. For each service type in the CR, if a type stack satisfying the requirements can be found, such a type stack is selected and configured for a suitable VM flavor as a VNFC to generate a VNF configuration.

Based on a current VM flavor, the disclosed method calculates the number of VMs that a physical host can support. To do so from the physical host resource capacity, the disclosed method deducts the needs of the hypervisor, and if applicable, the host OS. The disclosed method also takes into account any overbooking factor allowed, and calculates the number of VMs by dividing the host's remaining resource capacity with the resource needs of the VM flavor. The overbooking factor indicates the ratio of the virtual resource capacity assigned to a physical host and the physical resource capacity available on that host. Since VMs hosted on a physical host may not execute all at the same time, the total capacity of a virtual resource represented by the hosted VMs does not need to be present as physical capacity of that resource to be able to serve those VMs. For example, if the overbooking factor is 1.2, then the virtual capacity of the VMs hosted on a physical host is 1.2 times the capacity of the physical resources for memory, CPU core, etc.

The effect of collocation of AMF entities can be calculated when the resource needs of an SI in the active role is known. The resource need can be calculated using the information of the extended ETF, which provides for each component the resources it needs to provide a CSI of a component service type (CST). The CR specifies the composition of an SI of the service type in terms of the CSTs and the number of CSIs of each CST in the service type. Thus, the resource needs of a single SI are the sum for all CSTs of the product of the number of CSIs of the CST and the resource needs of the component in the given type stack to provide that CST. Based on the resource needs of an SI, the disclosed method calculates, for the current VM flavor, the maximum number of SIs that it can theoretically support (i.e. VM flavor capacity).

The calculated maximum number of SIs is a theoretical limit; as in practice this may be further limited due to the requested service availability: entities are assumed to fail on their own at the rate given in the extended ETF and CR. In case of a failure of a hosting entity (e.g. VM, physical host, etc.) all the hosted entities fail with it and the availability of all the SIs served by those hosted entities is impacted. Thus, there is an interference among collocated entities. In addition, AMF implements a fault escalation policy for the case of repeated or multiple failures, i.e. repeated failures of hosted entities are escalated to the hosting entity. It is assumed that a similar policy is applied to VMs hosted on the same physical host.

Figure 3:
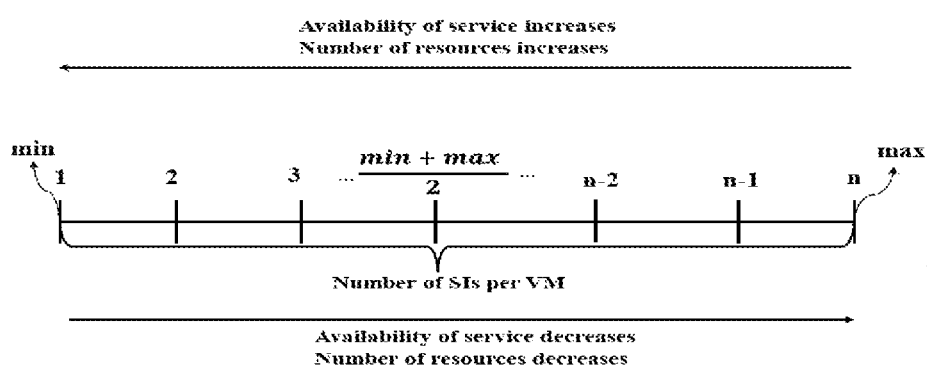
FIG. 3 illustrates a relation between service availability and resource usage according to one embodiment.

FIG. 3 illustrates the relation between service availability and resource usage according to one embodiment. In this example, one is the minimum number and n is the maximum number of SIs that a VM may provide based on its capacity (i.e. the VM flavor capacity). As the number of SIs per VM increases gradually from 1 to n, the availability of the SIs decreases due to the increase in interference between the components or SUs collocated within the VM. From a resource usage perspective, collocating more components in a VM results in a smaller number of VMs needed and therefore fewer physical hosts. Thus, there is a tradeoff between resource usage and availability, and the actual number of SIs per VM may be somewhere between these minimum and the maximum numbers of SIs per VM.

To determine the number of SIs per VM, the disclosed method estimates the availability of an SI for the lower bound (i.e. min), the upper bound (i.e. max) and the midpoint mid=(min+max)/2. Depending on the availability estimate at these values, the calculations either stop or proceed with a new iteration after updating min or max with mid.

For example, min may be initialized as 1 and max as n. The disclosed method estimates the availability of an SI at min. If the estimated availability is equal to the requested availability, then the calculations stop and min becomes the number of SIs per VM. The type stack is discarded for the given VM flavor if the availability estimate for min=1 is less than the requested availability. As min=1 provides the highest availability that this type stack can provide, it means that the type stack cannot satisfy the requested availability.

Next, the availability of an SI at max is estimated. If the estimated availability is greater than or equal to the requested availability, then the calculation stops and max becomes the number of SIs per VM. Otherwise, the value mid is calculated, and the availability estimate for an SI at mid is determined. If the estimated availability at mid is equal to the requested availability, then the calculations stop and mid becomes the number of SIs per VM. If the estimated availability for mid is greater than the requested availability, then mid replaces min and the calculations proceed for a next iteration. If the estimated availability for mid is less than the requested availability, then mid replaces max and the calculations proceed for a next iteration. The calculations iterate until the estimated availability for mid is the requested availability. The result is the optimum VM capacity for the given VM flavor with respect to availability and resource utilization.

The availability estimation calculations in the disclosed method takes into account the failure rates of infrastructure entities and the interference of collocated entities, as will be described in detail later. These calculations include the calculations of the numbers of different entities, one of which is the number of SIs per physical host, which is used also in the selection of the VM flavor to be described next.

The disclosed method repeats the calculations for each of the applicable VM flavors (e.g. in the simplest case for all available VM flavors) and for each candidate type stack of each service type requested in the CR. Then a VM flavor is selected for a type stack such that the number of SIs per physical host is the highest, or—in other words—that the number of physical hosts required is the minimum. If two or more VM flavor-type stack pairs can provide the same highest host capacity, then any of them can be selected. To reduce the impacted number of SIs at VM failure, the smallest VM flavor may be selected. From the selected type stack and VM flavor, the complete AMF configuration may be generated based on the number of entity calculations used in the availability estimation.

This AMF configuration provides the internal configuration of the VNFCIs for the VNFC, providing the functionality equivalent to the service type of the SIs. Each VNFCI is configured for a separate VM. The VMs hosting SUs for the same SG form AMF node groups, which are anti-affinity groups in the context of NFVI.

The following is a summary of the principles of service availability estimation in the disclosed method. The actual formulas are provided later under the section heading of AVAILABILITY ESTIMATION METHOD.

To estimate the availability of an SI for a given type stack and a selected VM flavor, the disclosed method first calculates the number of entities of different types in the type stack. It starts out with the theoretical capacity of the VM stack, which cannot be more than the number of SIs of the given type requested in the CR.

Depending on the actual recovery of the components and the redundancy model of the SG in the type stack, the SU capacity is set either to a single SI or to the maximum possible within the VM. That is, if the impact of the failure of any component goes beyond the component itself and may impact another SI, then the SU capacity is set to a single SI so that the SU provides fault isolation between SIs. Otherwise, the fault isolation feature of the components is utilized, and these components are packed into a single SU to the theoretical maximum of the VM. In either case, vendor limitation is taken into account. That is, if the SU cannot provide at least one SI, the type stack is discarded and not considered further. If the SU cannot provide the theoretical maximum, then the SU capacity is set to the vendor specified maximum.

Based on the redundancy model, the number of SUs in an SG is calculated so that each of the assignments of an SI can be assigned to a different SU and that there is a spare SU for the redundancy models needing the spare (e.g. No-redundancy and N-way). The redundancy model also determines the relation between the SU capacity and the SG capacity, which are used to calculate the number of SGs for serving all the SIs.

Depending on the redundancy model, the VM capacity may or may not be used to the fullest. That is, for redundancy models with standby assignment(s), no two SUs of the same SG can be hosted on the same VM or the same physical host to avoid data loss and therefore service discontinuity. So in these cases, the calculated number of SGs puts a limit on the number of SUs per VM and per host as well. Otherwise VM failure or host failure may cause such data loss as they would host more than one SU from an SG.

Besides the number of SGs, the number of VMs per host is limited also by the resources of the host as mentioned earlier. Both need to be taken into account when calculating the required number of physical hosts for hosting all the SGs needed to provide all the SIs.

Once the numbers of different entities have been determined, the disclosed method calculates the numbers of collocated components per SU, collocated SUs per VM, and collocated VMs per host to determine the SI level interference. For the components of the SU, those needed to provide one SI are excluded. This calculating step can be skipped if the SU capacity is a single SI. For the SUs and VMs, their numbers are reduced by one to obtain the number of collocated entities.

The availability of a single SI is estimated as the product of its availability with respect to the components providing it, the infrastructure hosting those components and the interference between these collocated entities.

To estimate availability with respect to the components needed for providing the SI, the configuration is analyzed to determine the actual recovery, which determines the time needed to recover (MTTR). The MTTR can be used with the components failure rates (MTTF) to calculate the availability of the SI that they collectively provide.

With respect to the infrastructure, the recovery fails over the SI to another healthy VM on another host. It is on another host as the calculation of the number of entities (SUs and SGs) took into consideration the host redundancy needed. This recovery determines the time needed to recover, which together with the failure rate of the infrastructure entity determines the SI availability in this respect.

With respect to the interference, the escalation mechanisms are taken into account. It is assumed that an escalation occurs if the number of failures within a given scope and time exceeds a configured maximum. Such a policy can be applied at different levels. One approach is to determine the probability that the maximum number of failures happen within the configured time period based on the failure rate of the entities of the scope and the Poisson probability distribution function. This probability is then used to calculate the failure rate of a component due to interference (i.e. the failure rate of the component divided by the sum of such probabilities) and also to calculate the applicable recovery time (i.e. the sum of the applicable recovery times multiplied by their probabilities). Based on these, the availability of the SI with respect to interference can be calculated.

The following description explains how the AMF domain relates to the VNF domain. AMF can manage the availability of any application through an AMF configuration. In one embodiment, each VNF exposing a specific network functionality is mapped to an AMF App type that provides a service type. A VNF may consist of one or more VNFCs and each VNFC provides a specific service type (i.e. sub-functionality of the network function) and it is packaged as a software image. To be able to map a VNFC to the concepts in the AMF domain, a new concept called AMF node type is proposed. This AMF node type represents a collection of software images necessary for the service unit type that provides the service type of a VNFC. Each VNFCI runs in a dedicated virtualization container (e.g. VM). In the AMF domain, each AMF node can be mapped into a VM. Thus the VNFCI can be mapped to the AMF node, and the VNFCIs of a given VNFC to an AMF node group. In one embodiment of this disclosure, the terms VNFCI, AMF node and VM are used interchangeably.

Since the AMF node groups for instances of different VNFCs need to be disjoint, the disclosed method generates an AMF configuration for a service type, i.e. the service type to be provided by a VNFC. A VNFC is designed by grouping one or more AMF component types into a service unit type so that it can provide the service type. Based on the number of workload units (i.e. SIs) to be provided for the given service type (i.e. service capacity) and the requested level of service availability, the disclosed method determines the number of AMF entities (i.e. SUs, SGs, VMs) so that the VNFCIs providing the service can be deployed using the minimum number of physical hosts. The affinity and anti-affinity relations between the AMF entities are defined by AMF and therefore are reflected in the AMF configuration. In particular, nodes of an AMF node group are redundant entities therefore cannot be collocated. During deployment, the required number of VNFCIs of a VNFC are deployed using the AMF configuration and the VMs of these VNFCIs form an anti-affinity group. The proposed configuration generation method is applied in the same manner for each of the service types of the VNF to configure the VNFCIs of each VNFC.

CONFIGURATION GENERATION FOR VNFs. In one embodiment, the configuration generation process for VNFs receives three inputs: 1) the Configuration Requirements (CR); 2) the extended Entity Types File (ETF) model; and 3) the Infrastructure file. Referring again to FIG. 2, the CR, the extended ETF model and the Infrastructure file are an example of the configuration requirements 203, the description of available software components 201 and the infrastructure information 202, respectively. In the CR, the services to be provided in terms of number of SIs of a service type and the number of CSIs of a component service type in each SI is described. It also includes the required level of service availability. An ETF describes the software component types from the perspective of AMF. In these files, the software vendors describe the dependency, capability and limitations of software component types and the CST that the software can provide. In one embodiment, the ETF may also include the information about the prototypes for other AMF entities (SU type, SG type and the App type). An ETF model may include ETFs from different software vendors. The ETF model has been also extended to include reliability information (e.g. failure rates) and also the memory required per CSI of a CST. The Infrastructure file captures the information related to the capacity of the physical hosts and the VMs. The Infrastructure file also includes the details regarding the MTTF of physical hosts, host OS, hypervisor, VMs and guest OS.

ETF Prototype Selection. Referring to step 110 of FIG. 1, the ETF prototypes that can provide the requested service functionality, i.e. the service type, are selected and type stacks are built. A type stack is the combination of ETF prototypes that together can provide the requested functionality. Furthermore, the selected prototypes are adjusted to improve their service availability: some of the recovery related attributes are altered to minimize the impact zone. This step also estimates the maximum level of service availability using the ETF prototypes of each type stack if they can provide the requested level of service availability. If it is not the case, the type stack is discarded at this stage of the configuration generation process. Type stacks that meet the requested level of availability are considered for the next step.

AMF type creation. Software entity types that are defined for the AMF management purposes are called AMF types. At step 120 of FIG. 1, AMF component types and other compound AMF types (App type, SG type and SU type) are created from their corresponding ETF prototypes. In case of the absence of any prototype for the compound AMF types, they are created at this stage. An ETF prototype specifies the range of possible configuration options, which allow the creation of multiple AMF types from the same ETF prototype. Using the separation of CSTs design pattern, AMF types are created in such a way that a failure of a component will affect the minimum number of SIs. Also, if the CR does not specify the redundancy model for the SG type(s), then the appropriate redundancy model is determined in this step based on the active and standby capabilities of the component types.

AMF entities creation. Step 130 of FIG. 1 creates the instances from the AMF types that are able to handle the workload requested and provide protection for it. The disclosed method optimizes the numbers of SUs, SGs, and VMs so that the minimum number of physical hosts is needed to meet the requested level of service availability. In the context of designing a VNFC, the SUs and VMs need to be identical as they provide the same service type. In this disclosure, identical physical hosts are considered. Step 130 includes two sub-steps 132 and 134, which are described in detail below.

At sub-step 132, the number of SIs per VM is determined from the perspective of availability and resource utilization. VMs are available in various flavors. The term "VM flavor" refers to a particular setting of a set of parameters and characteristics, e.g. the VM size in terms of memory, disk, CPU speed, I/O, etc. In other words, a VM flavor is a profile of a VM. For example, a VM flavor may be small, medium, large, etc., with respect to the VM capacity. For each VM flavor available in the infrastructure file, the procedure to determine the No of SIs per VM from the perspectives of availability and resource utilization is performed.

Initially, the memory needed by the components collaborating to provide an active SI assignment of the requested service type is calculated. It is the summation of the memory needed for all the CSIs of an SI as shown in the Equation (1). Here, Memory required per CST represents the memory required for all the CSIs per CST.

$$\text{Memory required per SI} = \Sigma_{k=1}^{k \le m} \text{Memory required per CST}_k \qquad (1)$$

k iterates through the m component service types in the service type. Equation (2) determines the Memory required per CST by multiplying the Memory required per CSI and the No of CSIs per CST. The Memory required per CSI of a CST and the No of CSIs per CST are obtained from the extended ETF model and the CR respectively.

$$\text{Memory required per CST} = \text{Memory required per CSI} * \text{No of CSIs per CST} \qquad (2)$$

The total guest memory (TGM) of a VM is used by the guest OS and the components hosted by the VM. To determine the guest memory available (AGM) to host the components, the virtual memory required by the guest OS (GOSM) is excluded from the TGM as shown in Equation (3).

$$\text{AGM} = \text{TGM} - \text{GOSM} \qquad (3)$$

Next, based on the memory required to provide an active SI assignment and the AGM, the number of SIs per VM (No of SIs per VM) is determined using Equation (4).

$$\text{No of SIs per VM} = \text{floor}\left(\frac{AGM}{\text{Memory required per SI}}\right) \qquad (4)$$

Once the No of SIs per VM is calculated, then the next step is to determine the capacity of the SU in terms of SIs and the number of SGs (No of SGs) and evaluate the effect of collocating components in an SU, collocating SUs in a VM and collocating VMs in a physical host. These collocated entities are those that are hosted in the same environment as the components providing the SI, whose availability is estimated below. The failure of these collocated entities causes the recovery action to be performed in a bigger scope and this impacts the availability of the other SIs. For example, if the components in the collocated SUs are configured to recover with component restart fails repeatedly, then in order to capture the fault the recovery action may escalate from component level to the SU and VM levels thereby affecting the availability of other SIs.

Even though the capacity of the VM sets an upper limit for the number of SIs that the VM can host, in reality it is limited due to the interference caused due to the collocated entities, the capacity of the SU and the No of SGs. Min represents the minimum number of SI (which is actually one) a VM may provide while max represents the maximum number of SIs a VM can support based on its capacity, the SU capacity and the No of SGs.

When the No of SIs per VM (i.e. the components providing these SIs) is increased gradually from min to max, the availability of the services decreases as the interference between the collocated components increases. On the other hand, the collocation of components in the VMs results in lesser number of VMs and physical hosts as shown in FIG. 3. The disclosed method determines the actual No of SIs per VM that meets the requested availability and results in minimum number of physical hosts.

FIG. 4 illustrates an algorithm (i.e. Algorithm-1) for calculating the number of SIs per VM for a type stack according to one embodiment. FIG. 5 illustrates an algorithm (i.e. Algorithm-2) for determining the number of entities and number of collocated entities for a type stack according to one embodiment. In the following, the availability of an SI is estimated for the best and the worst availability case scenarios.

Estimate availability for the best case scenario. Referring to FIG. 4, initially, Algorithm-1 determines the number of entities such as the No of SGs, the number of VMs (No of VMs), the number of physical hosts (No of PHs) and the number of collocated entities for min using the Algorithm-2 (line 5). Here, min represents the best case scenario from the perspective of availability estimation because there is only one SU in a VM that is providing an SI and there are no collocated SUs in a VM. As a result, it provides the maximum level of service availability. While interference due to the collocation of VMs exists, this is less than the interference due to the collocation of SUs in a VM. This is because VMs provide better fault isolation compared to SUs. The availability provided by this best case scenario is estimated (line 6). If the estimated availability is less than the requested availability even for this best case scenario, then this type stack is discarded for the given VM flavor (lines 7-9). This is because if the type stack is not able to meet the requested availability for the best case scenario then, it is unlikely that the requested availability will be met for any case for a given VM flavor. However, the estimated availability for the best case scenario may meet for the other available VM flavors, due to the varying MTTF and the number of collocated VMs for each flavor.

If the estimated availability is equal to the requested availability, then min becomes the No of SIs per VM (lines 10-11). On the other hand, if the estimated availability is greater than the requested availability, then the availability is estimated for the worst case scenario because with respect to resource utilization this is the best case (lines 12-13).

Estimate availability for the worst case scenario. As mentioned before, while determining the number of entities it is possible that due to the limitation on the capacity of the SU and the No of SGs, the No of SIs per VM may be reduced. If reduced, this becomes the max and the number of collocated entities is calculated based on this (line 19-20). Max represents the worst case scenario for availability estimation because, the interference between the collocated components is the maximum. However, this is the best case from the resource utilization perspective. If the estimated availability is greater than or equal to the requested availability, then max is selected to be the No of SIs per VM because the requested availability is met and also it infers the lowest number of VMs and physical hosts (line 36-37) for the VM flavor. If the worst case scenario is not satisfied but the best case scenario is satisfied, then the solution lies between min and max. To converge faster to the solution, the number of entities is calculated next half way between them i.e. at floor (min+max)/2. Again, the No of SIs per VM may be reduced due to the distribution of SIs and this reduced SIs per VM, if any, becomes the mean (lines 24-25).

When availability is estimated for this mean, three possible cases exist. They are: (i) If the estimated availability is equal to requested availability, then the mean becomes the number of SIs per VM (line 33-34). (ii) If the estimated availability is greater than requested availability, then the solution interval becomes [mean, max] and the value of min is updated to the mean (line 30-31). (iii) If the estimated availability is lesser than the requested availability, then the solution interval becomes [min, mean] and the value of max is updated to the mean (line 27-28).

When the case is either (ii) or (iii), the above mentioned procedure is repeated until the estimated availability for the middle point of interval meets the requested availability.

The VM flavor is selected at sub-step 134 of FIG. 1. A physical host has a finite capacity and the number of identical VMs it can host depends on the VM flavor, which among others specifies the total guest memory associated with the flavor. From the set of available VM flavors specified in the infrastructure file, the above mentioned procedure to determine the No of SIs per VM from the availability and resource perspective is repeated (i.e. the first phase in the AMF entities creation step). During this process, the number of entities and the number of SIs per PH (No of SIs per PH) is also determined for each VM flavor (described below in NUMBER OF ENTITIES CALCULATION METHOD). To select the VM flavor, the VM flavor with the highest No of SIs per PH is selected. This selection provides the highest utilization of the host as its resources are mostly used by the SIs and it infers minimum number of physical hosts. However, if two or more VM flavors support maximum No of SIs per PH, then the VM flavor with the smallest TGM is selected based on the availability considerations. Namely, the smallest VM flavor provide better fault isolation compared to other VM flavors.

Distribute AMF entities for deployment. While distributing the AMF entities for deployment at step 140 of FIG. 1, the affinity/anti-affinity relation between the AMF entities is defined and the AMF entities are configured. The relation between the SUs is defined by the SGs: SUs that are providing and protecting the same SIs, i.e. they are part of the same SG, cannot be hosted on the same VM or physical host. The relation between the VMs is defined by the VM group. While determining the number of entities (to be described below), along with the No of VMs, the number of VM groups (No of VM groups), the number of redundant VMs in a VM group is also defined. In addition to that, the number of SUs that can be hosted per VM is also determined, based on this the configuration attributes related to the distribution of SGs on the VM groups is set. Finally, an AMF configuration is generated.

The information about the number of entities calculated can be used to deploy and configure a VNF in the NFVI. For example, the No of VMs represents the required number of VNFCIs of a VNFC. The number of VMs in a VM group represents the number of VNFCIs of a VNFC in the anti-affinity relation. The selected VM flavor can be used to deploy a VNFCI. The calculated No of PHs can be used to deploy the VNFCIs of a VNFC.

Figure 6A:
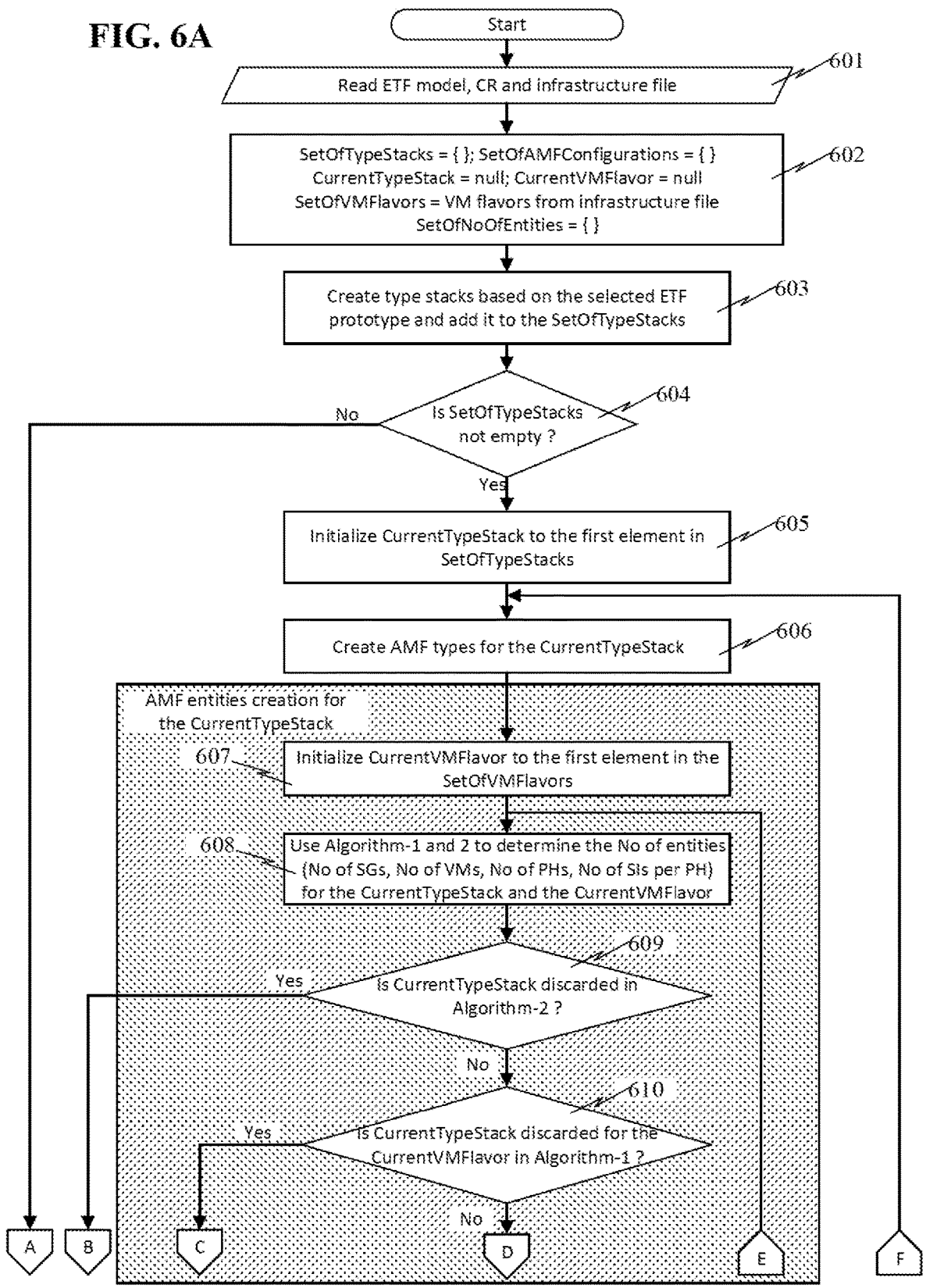
FIG. 6A and FIG. 6B illustrate an overall process for the generation of AMF configuration for a VNF according to one embodiment.
Figure 6B:
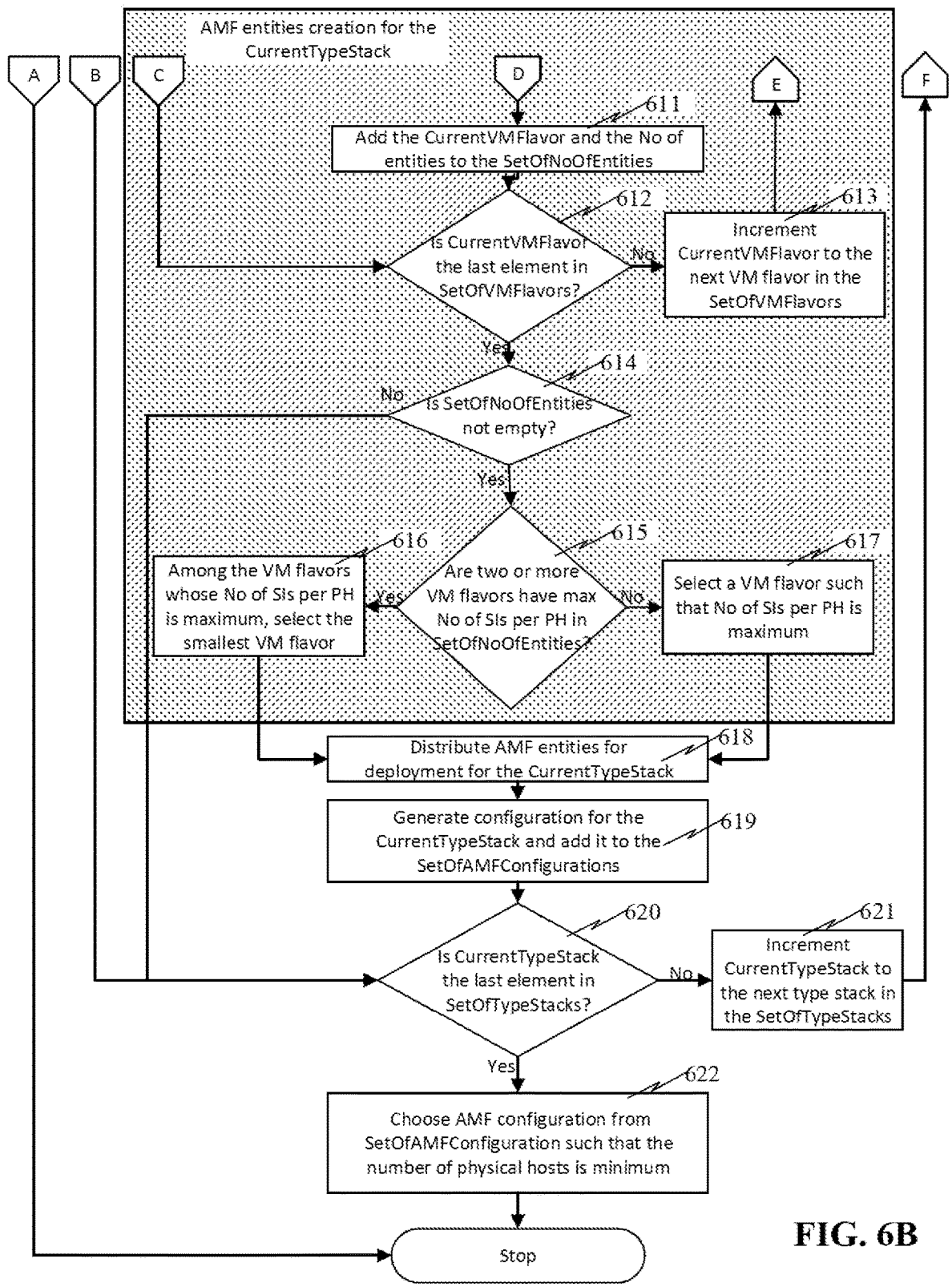

FIG. 6A and FIG. 6B illustrate an overall process 600 for generating an AMF configuration for a VNF according to one embodiment. The process 600 is an example of the disclosed method, and may be performed by a system such as the embodiments shown in FIG. 9, 10 or 11. At step 601, the system reads the ETF model, CR and infrastructure file. At step 602, the system initializes a number of sets for keeping track of type stacks, VM flavors and number of entities. For a service type provided by the VNFC, one or more type stacks based on the selected ETF prototype are created at step 603. For each type stack, the AMF type creation (step 606), the AMF entities creation (steps 607-617) and the distribution of AMF entities for deployment (step 618) are repeated. During the AMF entities creation, for each type stack the steps 608-613 for determining the No of SIs per PH is repeated for all the VM flavors. If the best case scenario for all the VM flavors do not meet the requested availability, then the type stack is discarded (see Algorithm-1) at step 610. If a type stack is not able to provide an SI, then it is discarded (see Algorithm-2) at step 609. For those type stacks that meet the requested availability, AMF configurations are generated at step 619. Among these generated configurations, the configuration that uses minimum number of physical hosts is selected for deployment of VNFCIs at step 622. The process 600 repeats for each of the service types of the VNF to configure the VNFCIs of each VNFC.

NUMBER OF ENTITIES CALCULATION METHOD. Depending on the No of SI per VM, the number of entities and the number of collocated entities is determined. Referring to FIG. 5, initially, Algorithm-2 checks if an SU is able to provide at least one SI or limited by the SU type (lines 3-8). A vendor delivering an SU type may restrict the number of components per component type (Max no of comps per CT) that can be put together in an SU. Min no of comps per CT denotes the minimum number of components per component type to provide an SI. It is calculated based on the No of CSIs per CST and the active and standby capability of components. If the Min no of comps per CT is greater than the Max no of comps per CT, then an SU cannot be formed. Therefore, this type stack is discarded. Next, the No of SIs per SU and the number of components required to form an SU (No of comps per SU) is determined (lines 9-19). The No of SGs calculation is done per component type and the one that results in greater number of SGs is considered (lines 20-23). Finally, the No of SIs per VM, No of VMs, No of PHs required to deploy the SGs and also the number of collocated entities is determined (line 24).

Determine the number of SIs per SU Since an SU can group components serving one or multiple SIs we can group components in multiple ways to form an SU. There are two extremities: 1) the SU serving a single SI; and 2) the SU serving the maximum number of SIs.

1) The SU serving a single SI: A SU may contain components belonging to different types and each of them may recover based on their configured recovery action. The actual recovery of components in the context of configuration is determined using an actual recovery algorithm. When the actual recovery of any one of the components composing the SU is not component restart or component failover, then single SI per SU solution is preferred. For example, if an SU has two types of components that recover with component restart and SU restart respectively. If components that recover with component restart fail, the impact is only at the component level. That is, component restart recovery action will not affect the availability of other SIs provided by that SU. On the other hand, if any component that recover with SU restart fails, then the entire SU will be restarted and all SIs served by the SU would be impacted. The number of impacted SIs can be reduced by reducing the number of SIs the SU serves that is grouping into the SU only component(s) required for one SI. This is a cost-effective approach to minimize the interference between collocated components because SUs serve as a fault-isolation unit, but they are only logical groupings. They do not imply any overhead as opposed to VMs.

If an SG type is following No-redundancy redundancy model, then SUs in that SG can take at most one SI assignment. In this case also, the No of SIs per SU is one.

2) The SU serving the maximum number of SIs: This solution is preferred if the actual recovery of all the component types in an SU is at the component level. If the actual recovery of components is component failover, then depending on the redundancy model the impact of the component failure will not affect the other SIs provided by an SU. If the actual recovery of the components in the SU is component restart, then there is only a small probability that the recovery action will escalate—due to repeated failures—from component restart to the SU and VM levels. As a result, in this case the maximum number of components that can be grouped together is preferred. No of SIs per SU may be limited by the VM flavor, or by the SU type provided by the vendor or the No of SIs (Equation (5)). Next, depending on the No of SIs per SU, the number of components in an SU is calculated using Equation (6) and (7). Note that, in Equation (5) and (6) j iterates through the N component types in an SU.

$$\text{No of SIs per SU} = \min\left(\min_{1 \leq j \leq N} \text{floor}\left(\frac{\text{Max no of comps per } CT_j}{\text{Min no of comps per } CT_j}\right), \text{No of SIs per VM, No of SIs}\right) \quad (5)$$

$$\text{No of comps per SU} = \sum_{j=1}^{j \leq N} \text{No of comps per } CT_j \quad (6)$$

$$\text{No of comps per CT} = \quad (7)$$
$$\text{No of SIs per SU} * \text{Min no of comps per CT}$$

Determine the number of SUs per SG and the number of SGs. The No of SUs per SG and the No of SGs are determined based on the redundancy model of the SG type. Except for the No-redundancy redundancy model, in each redundancy model the redundancy is considered on the service side as well as on the service provider side. The number of active and standby assignments per SI defines the redundancy on the service side and the number of SUs per SG defines the redundancy on the service provider side. The redundancy requirement from the service side dictates the number of redundant service providers.

1) For the No-redundancy redundancy model, each SI has at most one active assignment and no standby assignments. This redundancy model does not have redundancy on the service side. The redundancy on the service provider side is ensured by having spare SUs in the SG. As long as there are enough spare SUs to protect the SIs against failure, this redundancy model does not require all the SUs of an SG to be hosted on different VMs and physical hosts. The No of SUs per SG required is determined using Equation (8). To provide the entire SIs specified in the CR, the No of SGs is calculated using Equation (9).

$$\text{No of SUs per SG} = \min(\text{No of SIs per VM, No of SIs})*2 \quad (8)$$

$$\text{No of SGs} = \text{ceil}\left(\frac{\text{No of SIs}}{\text{No of SIs per VM}}\right) \quad (9)$$

2) In the 2N redundancy model, each SI has at most one active assignment and one standby assignment. At run-time, AMF assigns all the active assignments of all the SIs to one SU in the SG—which becomes the active SU—and all the standby assignment to another—the standby SU. In the event of a failure of the active SU, the standby SU takes over the active role and starts providing all the SIs. This implies that, a minimum of two SUs is required in an SG to provide and protect an SI (Equation (10)). The next step is to analyze the maximum number of active and standby assignments an SU can handle (Equation (11 and 12)). The No of comps per CT used in Equations (11 and 12) represents the number of components per component type in an SU, calculated using Equation (7). Also, act cap per CST represents the active capability of a component type to provide a service and std cap per CST denotes the standby capability of a component type. The No of CSIs per CST represents the number of CSIs in an SI. The Max no of SIs per SG is calculated using Equation (13). It is the minimum of Max no of SIs per act SU and Max no of SIs per std SU. Finally using Equation (14), the No of SGs is calculated based on the No of SIs specified in the CR and Max no of SIs per SG.

$$\text{No of SUs per SG} = 2 \quad (10)$$

$$\text{Max no of SIs per act SU} = \quad (11)$$
$$\text{floor}\left(\frac{\text{No of comps per } CT * \text{act cap per } CST}{\text{No of CSIs per } CST}\right)$$

$$\text{Max no of SIs per std SU} = \quad (12)$$
$$\text{floor}\left(\frac{\text{No of comps per } CT * \text{std cap per } CST}{\text{No of CSIs per } CST}\right)$$

$$\text{Max no of SIs per SG} = \quad (13)$$
$$\min(\text{Max no of SIs per act SU}, \text{Max no of SIs per SU})$$

$$\text{No of SGs} = \text{ceil}\left(\frac{\text{No of SIs}}{\text{Max no of SIs per SG}}\right) \quad (14)$$

3) In the N+M redundancy model, each SI has an active assignment and a standby assignment. As opposed to the 2N redundancy model, this model allows for N active SUs and M standby SUs in the SG. Therefore, to determine the N and M numbers of active and standby SUs of an SG, initially the needed total number of active SUs and total number of standby SUs are calculated using Equations (15) and (16). The Max no of SIs per act SU and Max no of SIs per std SU in Equation (15) and (16) are calculated using Equation (11) and (12) respectively. Equation (17) and (18) represents the active and standby SUs proportion that can be used to construct an SG. In the prior method the No of SUs per SG have been constructed in such a way that the Act proportion and Std proportion did not exceed the number of nodes. In contrast, in the disclosed method, since the number of nodes is not given as input, the No of SUs per SG is the sum of active and standby SUs proportion as shown in Equation (19). This represents the minimum number of redundant entities required i.e. the number of VMs in a VM group or the number of redundant physical hosts. Finally the No of SGs is calculated using Equation (20).

$$\text{No of act SUs} = \text{ceil}\left(\frac{\text{No of SIs}}{\text{Max no of SIs per act SU}}\right) \quad (15)$$

$$\text{No of std SUs} = \text{ceil}\left(\frac{\text{No of SIs}}{\text{Max no of SIs per std SU}}\right) \quad (16)$$

$$\text{Act proportion} = \left(\frac{\text{No of act SUs}}{\min(\text{No of act SUs}, \text{No of std SUs})}\right) \quad (17)$$

$$\text{Std proportion} = \left(\frac{No \text{ of std } SUs}{\min(No \text{ of act } SUs, No \text{ of std } SUs)}\right) \quad (18)$$

$$No \text{ of } SUs \text{ per } SG = \text{Act proportion} + \text{Std proportion} \quad (19)$$

$$No \text{ of } SGs = \text{ceil}\left(\frac{No \text{ of act } SUs + No \text{ of std } SUs}{No \text{ of } SUs \text{ per } SG}\right) \quad (20)$$

In the N-way-active redundancy model, each SI has two or more active assignments and no standby assignments. The required number of active assignments (No of active assignments) is specified in the CR, and it is assumed that all the SIs have the same number of active assignments. At runtime, AMF assigns each active assignment of an SI to a different SU in the SG. In the event of a failure of any one of the SUs, the service is not interrupted as the service—the SI—is still provided by the other SUs active for the SI in the SG. Therefore, No of SUs per SG is equal to the No of active assignments as shown in Equation (21). The No of SGs is calculated using Equation (14). However, Max no of SIs per SG used in Equation (14) is calculated using Equation (22).

$$\text{No of SUs per SG} = \text{No of active assignments} \quad (21)$$

$$\text{Max no of SIs per SG} = \min(\text{Max no of SIs per act SU}, \text{No of SIs}) \quad (22)$$

For the N-way redundancy model, each SI has one active assignment and one or more standby assignments. The required number of standby assignments (No of std assignments) is specified in the CR. It is assumed that each SI has the same number of standby assignments. The No of SUs per SG is equal to sum of the No of std assignments and one for the active assignment and one for the spare SU as shown in Equation (23). The No of SGs is calculated using Equation (14). However, the Max No of SIs per SG used in Equation (14) is calculated using Equation (24).

$$\text{No of SUs per SG} = \text{One active assignment} + \text{No of std assignments} + 1 \quad (23)$$

$$\text{Max no SIs per SG} = \min(\text{Max no of SIs per act SU} \ast (\text{No of SUs per SG}-1), \text{Max no of SIs per std SU}, \text{No of SIs}) \quad (24)$$

Determine the number of SUs per VM and the number of SIs per VM: The number of SUs per VM (No of SUs per VM) is the minimum of maximum number of SUs a VM can host based on its capacity and the No of SGs as shown in the Equation (25). For No-redundancy model, Equation (26) is used to calculate the No of SUs per VM. Based on the No of SUs per VM and the No of SIs per SU, the No of SIs per VM is calculated as shown in the Equation (27). It is important to recalculate the No of SIs per VM due to the distribution of SIs to the SUs in a VM vertically and also to the redundant SUs in SGs horizontally.

$$No \text{ of } SUs \text{ per } VM = \min\left(\text{floor}\left(\frac{No \text{ of } SIs \text{ per } VM}{No \text{ of } SIs \text{ per } SU}\right), No \text{ of } SGs\right) \quad (25)$$

For No-redundancy model, $$\text{No of SUs per VM} = \min(\text{No of SIs per VM}, \text{No of SIs}) \quad (26)$$

$$\text{No of SIs per VM} = \text{No of SUs per VM} \ast \text{No of SIs per SU} \quad (27)$$

Determine the number of VM groups, the number of VMs and the number of physical hosts. The total physical memory (TPM) of a host is used by the hypervisor, host OS and by the VMs residing on that host. Therefore next to calculate the physical memory that is available (APM) to host the VMs, the memory required for the hypervisor and the host OS are excluded from the TPM as shown in the Equation (28). The number of VMs a physical host can host (No of VMs per PH) is calculated based on the APM, the TGM of the VM flavor and an overbooking factor using Equation (29). The overbooking factor indicates to what extent the number of VMs per physical host can be increased by serializing their execution. The No of VM groups i.e. AMF node groups is calculated based on the No of SGs and the No of SUs per VM as shown in Equation (30). For No-redundancy model, Equation (31) is used to calculate the No of VM groups.

$$APM = TPM - (HOSM + HM) \quad (28)$$

$$No \text{ of } VMs \text{ per } PH = \text{ceil}\left(\frac{APM \ast OBF}{TGM}\right) \quad (29)$$

$$No \text{ of } VM \text{ groups} = \text{ceil}\left(\frac{No \text{ of } SGs}{No \text{ of } SUs \text{ per } VM}\right) \quad (30)$$

For No-redundancy model, $$No \text{ of } VM \text{ groups} = \text{ceil}\left(\frac{No \text{ of } SIs}{No \text{ of } SIs \text{ per } VM}\right) \quad (31)$$

The maximum number of VMs per physical host (Max no of VMs per PH) is the minimum of the No of VMs per PH required and the No of VM groups (Equation (32)). The No of SUs per PH is the product of Max no of VMs per PH and the No of SUs per VM as shown in the Equation (33).

$$\text{Max no of TMs per PH} = \min\{\text{No of TMs per PH}, \text{No of VM groups}\} \quad (32)$$

$$\text{No of SUs per PH} = \text{Max no of TMs per PH} \ast \text{No of SUs per VM} \quad (33)$$

By multiplying the Max no of VMs per PH and the No of SIs per VM, the No of SIs per PH determined (Equation (34)). The total No of VMs and the total No of PHs required for deploying the SGs are calculated using Equations (35-37) respectively. K denotes the number of redundant entities i.e. redundant VMs per VM group and the number of redundant physical hosts. For No-redundancy redundancy model, the number of redundant entities required is two (K=2). However, for the other redundancy models, the No of SUs per SG determines the number of redundant entities.

$$No \text{ of } SIs \text{ per } PH = \text{Max } no \text{ of } VMs \text{ per } PH \ast No \text{ of } SIs \text{ per } VM \quad (34)$$

$$No \text{ of } VMs = No \text{ of } VM \text{ groups} \ast K \quad (35)$$

$$No \text{ of } PHs = \text{ceil}\left(\frac{No \text{ of } SGs}{No \text{ of } SUs \text{ per } PH}\right) \ast K \quad (36)$$

For No-redundancy redundancy model, $$\text{No of PHs} = ceil\left(\frac{\text{No of SIs}}{\text{No of SIs per PH}}\right) * K \qquad (37)$$

Determine the number of collocated entities. The No of coll comps per SU is calculated using Equation (38). Since the availability is estimated for one SI in an SU, the number of collocated components for each component type in an SU is calculated by excluding the components that provides one SI from the components in an SU (Equation 39). Using Equation (40), the number of collocated SUs in a VM (No of coll SUs) is calculated by excluding one SU whose SI's availability is being estimated. Similarly, the number of collocated VMs (No of coll VMs) is determined by excluding one VM from the Max No of VMs per PH as shown in Equation (41).

$$\text{No of coll comps per SU} = \sum_{j=1}^{j \leq N} \text{No of coll comps per } CT_j \qquad (38)$$

where j iterates through the N component types in an SU.

No of coll comps per CT=No of comps per CT-Min no of comps per CT (39)

No of coll SUs=No of SUs per VM−1

(40)

No of coll VMs=Max no of VMs per PH−1

(41)

AVAILABILITY ESTIMATION METHOD. The service availability is estimated per service instance (SI).

Availability of SI=$A_{components} * A_{infrastructure} * A_{collocated\ entities}$ (42)

As shown in Equation (42), the availability of the service instance broadly depends on the following factors: A) the availability of the components providing the service; B) the availability of the virtual and physical infrastructure; and C) the interference caused by the collocated entities.

The availability calculation for each entity in the system takes into account two factors: MTTF and MTTR. From a service perspective, MTTF is the mean time that an entity takes to fail while the MTTR is the mean time required to recover the service provided by the failed entity. Once the MTTF and MTTR are known, the availability of the service can be determined using the Equation (43).

$$\text{Avaialbility} = \frac{MTTF}{MTTF + MTTR} \qquad (43)$$

Availability of the components providing the service. For availability due to the failure of components, it is assumed that the software vendor provides the MTTF for each component type, which may be a result of benchmark analysis. To calculate the time needed to recover the service due to the failure of the components ($MTTR_{component}$), the actual recovery actions of the components in the context of the configuration is analyzed. Based on this actual recovery action, the estimated time to recover the service is calculated. Equation (44) may be used to calculate the availability of components providing an SI.

$$A_{components} = \prod_{J=1}^{J \leq N}\left(\frac{MTTF_{component_j}}{MTTF_{component_j} + MTTR_{component_j}}\right)^{p_j} \qquad (44)$$

where j iterates through N component types in an SU type. $MTTF_{component}$ and $MTTR_{component}$ is the mean time for a component type to fail and time required to recover the SI due to a component failure respectively. $p_j$ is the required number of components of a component type to provide one SI.

Availability of the infrastructure. As shown in Equation (45), the availability of the infrastructure is calculated as the product of the availability of the virtual infrastructure ($A_{vi}$) and the availability of the physical infrastructure ($A_{pi}$).

$$A_{infrastructure} = A_{vi} * A_{pi} \qquad (45)$$

$A_{vi}$ is calculated as the product of availability of the VM ($A_{vm}$) and the availability of the guest OS ($A_{guestOS}$) as shown in Equation (46). It is assumed that the MTTF of the VM and the guest OS are obtained from the infrastructure provider. While calculating the $MTTR_{infra}$, it is assumed that the SIs are failed over to another healthy VM hosted on a redundant host. As shown in Equation (48), the $MTTR_{infra}$ is the time required to detect a VM failure (Detection time) and also to recover the service from the failed VM (Failover time). It is assumed that the VM failures are monitored and detected by the Virtualized Infrastructure Manager (VIM) in the NFVI.

$$A_{vi} = A_{vm} * A_{guest\ OS} \qquad (46)$$

$$A_{vi} = \left(\left(\frac{MTTF_{vm}}{MTTF_{vm} + MTTR_{infra}}\right) * \left(\frac{MTTF_{guestOS}}{MTTF_{guestOS} + MTTR_{infra}}\right)\right) \qquad (47)$$

$$MTTR_{infra} = \text{Detection time} + \text{Failover time} \qquad (48)$$

$$\text{Failover time} = \text{Max}_{1 \leq j \leq N}(CSS_j) \qquad (49)$$

In Equation (49), failover is assumed to occur in parallel, therefore the failover time is the maximum time required to set HA state assignment to components (CSS). j iterates through N component types hosted per VM.

The availability of the physical infrastructure $A_{pi}$ is calculated as the product of the availability of the physical hardware ($A_{ph}$), the availability of the hypervisor ($A_{hypervisor}$) and the availability of the host OS ($A_{hostOS}$) (Equation 50). When any of these (physical hardware, hypervisor or host OS) fail, it is assumed that each VM is failed over independently to another healthy VM hosted on a redundant host. $MTTR_{infra}$ is the time required to detect the VM failure and the time required to failover the SIs from that failed VM as shown in the Equation (48). The MTTF values ($MTTF_{ph}$, $MTTF_{hostOS}$ and $MTTF_{hypervisor}$) are obtained from the infrastructure provider.

$$A_{pi} = A_{ph} * A_{hypervisor} * A_{hostOS} \qquad (50)$$

$$A_{pi} = \left(\begin{array}{c}\left(\frac{MTTF_{ph}}{MTTF_{ph} + MTTR_{infra}}\right) * \left(\frac{MTTF_{hostOS}}{MTTF_{hostOS} + MTTR_{infra}}\right) * \\ \left(\frac{MTTF_{hypervisor}}{MTTF_{hypervisor} + MTTR_{infra}}\right)\end{array}\right) \qquad (51)$$

Figure 7:
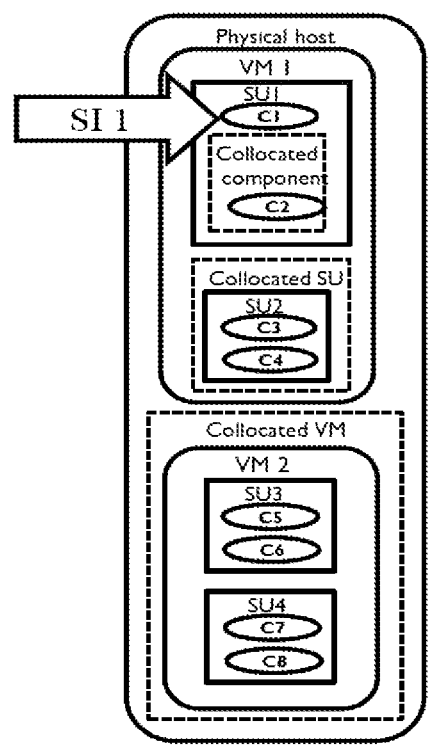
FIG. 7 illustrates an example of collocated entities according to one embodiment.

Availability of the service due to interferences of collocated entities. The failure of collocated components may affect the availability of other SIs provided in that environment. Considering the example illustrated in FIG. 7, the availability of SI 1 is affected by the failure of collocated component C2 or SU2 or VM 2. The following sub-sections show the calculations of the availability for: the components collocated in an SU, the SUs collocated in a VM and for the VMs collocated in a physical host.

1) Availability of collocated components due to interferences. When any one of the collocated components fails, there is a probability that the recovery action is escalated to SU restart or SU failover or VM failover or VM reboot. To calculate the availability of collocated components due to the interferences, the following probabilities are calculated. a. Probability of escalating the recovery action to SU restart; b. Probability of escalating the recovery action to SU failover; c. Probability of escalating the recovery action to VM failover; and d. Probability of escalating the recovery action to VM reboot.

a. Probability of escalating recovery action to SU restart. For the first time when a component fails, AMF performs a component restart recovery action. When a large number of components of the SU need to be restarted it is unlikely that the components carry the fault. To capture the fault, along with the failed components, its siblings are also restarted. This is called level 1 escalation. Note that the level 1 escalation is applicable only if all the components in an SU are restartable.

In particular, level 1 escalation is activated when the maximum number of allowed component restarts is reached within a given time period—the probation time. To calculate the probability of maximum number of component failures occurring in a time period (t), Poisson distribution can be used as shown in Equation (52). Since component restarts occur as soon as the components have failed, the probability of maximum number of component restarts P(x) level 1 occurring in a probation time can be calculated using Equation (53).

$$P(x) = \left( \frac{e^{-\lambda t}(\lambda t)^x}{x!} \right) \quad (52)$$

For an SU with only restartable components, $$P(\text{escalation to } SU \text{ restart}) = P(x)_{level1} = \left( \frac{e^{-\lambda t_{level1}}(\lambda t_{level1})^{x_{level1}}}{x_{level1}!} \right) \quad (53)$$

For level 1 escalation, $\lambda$ of Equation (53) represents the failure rate of the components and $x_{level1}$ denotes the maximum number of allowed component restarts within the level 1 probation time $t_{level\ 1}$. If there are N component types in an SU type and $p_i$ represents the number of components per component type then the failure rates of the components are added up as shown in Equation (54).

$$\lambda = \sum_{i=1}^{i \leq N} p_i \lambda_i = \sum_{i=1}^{i \leq N} p_i * \left( \frac{1}{MTTF_{component_i}} \right) \quad (54)$$

b. Probability of escalating recovery action to SU failover. Since level 1 escalation does not guarantee the resolution of the fault, further escalation levels are considered: Once level 1 escalation has been activated for an SU, whenever one of its components fails, the component is restarted along with its sibling components in that SU. If the components of an SU continue to fail and reach a second threshold within a second probation time period, then the SU restarts deemed to be futile and the recovery action is escalated to SU failover, i.e. level 2 escalation is reached. Note that level 2 escalation is applicable only if all the components in an SU are restartable. The probability of maximum number of allowed SU restarts occurring in a probation time $P(x)_{level2}$ is calculated using Equation (55) where $x_{level2}$ and $t_{level2}$ parameters are used as defined for level 2 escalation. P (escalation to SU failover) is calculated by multiplying the $P(x)_{level2}$ and the probability that the SU was already in level 1, P (escalation to SU restart) as shown in Equation (56). For an SU with only restartable components, $$P(x)_{level2} = \left( \frac{e^{-\lambda t_{level2}}(\lambda t_{level2})^{x_{level2}}}{x_{level2}!} \right) \quad (55)$$

$$P(\text{escalation to } SU \text{ failover}) = P(x)_{level2} * P(\text{escalation to } SU \text{ restart}) \quad (56)$$

c. Probability of escalating recovery action to VM failover. When a component of an SU on which level 2 escalation is active fails, then the SU is failed over. When the maximum number of permitted SU failovers (failover of SUs residing on the same VM) is reached within a time period $t_{level\ 3}$, then AMF assumes that the VM is faulty and it will failover the VM, i.e. all the SIs assigned to the VM to redundant VMs. The probability of maximum number of allowed SU failover $P(x)_{level3}$ occurring in a time period $t_{level\ 3}$ is calculated using Equation (57). $x_{level\ 3}$ and $t_{level\ 3}$, parameters are used as defined for level 3 escalation.

$$P(x)_{level3} = \left( \frac{e^{-\lambda t_{level3}}(\lambda t_{level3})^{x_{level3}}}{x_{level3}!} \right) \quad (57)$$

For an SU with only restartable components, $$P(\text{escalation to VM failover}) = P(x)_{level3} * P(\text{escalation to SU failover}) \quad (58)$$

For an SU with at least one non-restartable components, $$P(\text{escalation to VM failover}) = P(x)_{level\ 3} \quad (59)$$

If an SU has only restartable components, P (escalation to VM failover) is calculated by multiplying $P(x)_{level3}$ and P (escalation to SU failover) using Equation (58). If an SU has at least one non-restartable component, the failure of a component itself, triggers the SU-failover. In this case, P (escalation to VM failover) is calculated using Equation (59).

d. Probability of escalating VM reboot recovery action. During the component restart recovery action, AMF cleans up the faulty component and then tries to re-instantiate the component. However, if the cleanup action is unsuccessful or if all the allowed attempts of instantiation fail, then AMF assumes that the fault is in the VM and escalates the recovery action to VM reboot and all services provided by the VM are impacted. In this case, the probability of escalating the recovery action to VM reboot is calculated.

The restart recovery action may fail either during cleanup or while instantiating a component without or with delay. In Equation (60), P (CF) represents the probability of cleanup failures occurring during the component restart recovery action. When the cleanup action fails, the recovery action is escalated to VM reboot. For example, if the cleanup action is successful for the first time, but if the instantiation attempt fails, the cleanup action is performed again before attempting to instantiate a component. Therefore, there is a probability that clean up actions may fail while attempting to instantiate components without delay i.e. P (CFIWOD), calculated using Equation (62) or with delay i.e. P (CFIWD), calculated using Equation (63). As shown in Equation (61), the total number of instantiation attempts nia is given by the sum of NIWOD (Number of instantiation attempts without delay) and NIWD (Number of instantiation attempts with delay).

$$P(CF) = P(CFIWOD) + P(CFIWD) \quad (60)$$

$$nia = NIWOD + NIWD \quad (61)$$

$$P(CFIWOD) = \sum_{i=1}^{NIWOD} PCS^{i-1} * PINS^{i-1} * PCNS \quad (62)$$

$$P(CFIWD) = \quad (63)$$
$$PINS^{NIWOD} * \left[ \sum_{i=NIWOD+1}^{nia} PSC^{i-1} * PINSD^{(i-NIWOD-1)} * PCNS \right]$$

where PCS and PCNS represents the probability of cleanup successful and failure respectively. PINS and PINSD denotes the probability of instantiation not successful without and with delay respectively.

Even though the cleanup is successful, there is a probability that all the instantiation attempts may fail and escalate the recovery action to VM reboot. This is calculated using Equation (64). The probability of escalating the recovery action to VM reboot due to instantiation or termination failure is calculated using Equation (65).

$$P(IF) = PCS^{nia} * PINS^{NIWOD} * PINSD^{NIWD} \quad (64)$$

$$P(\text{escalation to VM reboot}) = P(CF) + P(IF) \quad (65)$$

Equation (66) calculates the MTTF$_{int\ of\ comps}$ for a component type based on the probability of escalating the recovery actions to SU level or VM level.

$$MTTF_{int\ of\ comps} = \frac{MTTF_{component}}{\left( \begin{array}{c} P(\text{escalation to } SU \text{ restart}) + P(\text{escalation to } SU \text{ failover}) + \\ P(\text{escalation to } VM \text{ failover}) + P(\text{escalation to } VM \text{ reboot}) \end{array} \right)} \quad (66)$$

Once MTTF$_{int\ of\ comps}$ is calculated, then the next step is to calculate the time required to perform VM failover and VM reboot recovery actions. To failover the SIs from a VM, primarily the components are cleaned up and if the cleanup action is successful, then the failed component's CSI is failed over and the healthy component's CSI are switched over. Switch over is a smooth transition of CSI. In Equation (67), the time required to perform VM failover (T$_{VM\ Failover}$) is the sum of the maximum time required to perform cleanup action and the maximum time required to perform failover action. Since the cleanup action for all components are executed in parallel, the maximum time required is considered as the cleanup time. Similarly, the maximum time required to perform failover action is considered as the failover time. Note that in the below Equation (67), j iterates through the N component types.

$$T_{VM\ failover} = \text{Max}_{1 \leq j \leq N}[\text{Cleanup time}_j] + \text{Max}_{1 \leq j \leq N}[\text{Failover time}] \quad (67)$$

In Equation (68), clt represents the time required for a component to perform cleanup action. The cleanup probabilities and the cleanup times are described in the extended ETF. Note that, if the cleanup action fails then the VM is rebooted. T$_{VM\ reboot}$ denotes the VM reboot time which is calculated using the Equation (69). NST represents the time required by a VM to shut down and it is described in the infrastructure file. CSS represents the time required to set the HA assignment state for a component belonging to a component type. Equation (70) gives the maximum failover time required by the components hosted per VM. SOT represents the time required by components to switch over the active assignments to healthy components hosted on other VMs. It is calculated using Equation (71).

$$\text{Cleanuptime} = [PCS * clt] + [PCNS * (clt + T_{VM\ reboot})] \quad (68)$$

$$T_{VW\ reboot} = NST + \text{Max}_{1 \leq j \leq N}(CSS_j) \quad (69)$$

$$\text{Failover time} = \text{Max}_{1 \leq j \leq N}[PCS_j * \text{Max}_{1 \leq j \leq N}(CSS_j, SOT_j)] \quad (70)$$

$$SOT = 2 * CSS \quad (71)$$

For each component belonging to a component type, there is a probability that the recovery action is SU restart or SU failover or VM failover or VM reboot. Equation (72) is used to calculate the mean time to recover the service due to the interference of the collocated components MTTR$_{int\ of\ comps}$. The time required to perform SU restart T$_{SU\ restart}$ and the time required to perform SU failover T$_{SU\ failover}$ can be calculated using a known method. Time required to perform VM failover T$_{VM\ failover}$ and the time required to perform VM reboot T$_{VM\ reboot}$ are calculated using Equations (67) and (69) respectively.

$$MTTR_{int\ of\ comps} = \left( \begin{array}{l} (P(\text{escalation to } SU \text{ restart}) * T_{SU\ restart}) + \\ (P(\text{escalation to } SU \text{ failover}) * T_{SU\ failover}) + \\ (P(\text{escalation to } VM \text{ failover}) * T_{VM\ failover}) + \\ (P(\text{escalation to } VM \text{ reboot}) * T_{VM\ reboot}) \end{array} \right) \quad (72)$$

$$A_{collocated\ components\ in\ a\ SU's\ nterference} = \quad (73)$$
$$\prod_{j=1}^{j \leq N} \left( \frac{MTTF_{int\ of\ comps\ j}}{MTTF_{int\ of\ comps\ j} + MTTR_{int\ of\ comps\ j}} \right)^{n_j}$$

Equation (73) is used to calculate the availability of collocated components in an SU. MTTF$_{int\ of\ comps}$ is calculated using Equation (66) and MTTR$_{int\ of\ comps}$ is calculated using Equation (72). j iterates through the N component types in an SU and n$_j$ represents the number of collocated components per component type in an SU. If there are no collocated components in an SU, then the availability due to collocated components is one.

2) Availability due to collocated SUs interferences. It is possible that the availability of SI may be affected when a recovery action is performed at the VM level due to collocated SUs in a VM. Here, $MTTF_{int\ of\ SUs}$ is calculated using Equation (74) and the mean time to recover the service due to the interference of the collocated SUs ($MTTR_{int\ of\ SUs}$) is calculated using Equation (75). Equation (76) is used to calculate the availability of collocated SUs in a VM. N represents the number of component types in an SU type, $p_j$ denotes the required number of components per component type and r is the number of collocated SUs in a VM. Note that if there are no collocated SUs in a VM, then the availability due to collocated SUs interference is one.

$$MTTF_{int\ of\ SUs} = \frac{MTTF_{component}}{P(\text{escalation to VM failover}) + P(\text{escalation to VM reboot})} \quad (74)$$

$$MTTR_{int\ of\ SUs} = \begin{pmatrix} (P(\text{escalation to VM failover}) * T_{VM\ failover}) + \\ (P(\text{escalation to VM reboot}) * T_{VM\ reboot}) \end{pmatrix} \quad (75)$$

$$A_{collocated\ SUs\ in\ a\ vm's\ interference} = \left[ \prod_{j=1}^{j \leq N} \left( \frac{MTTF_{int\ of\ SUs\ j}}{MTTF_{int\ of\ SUs\ j} + MTTR_{int\ of\ SUs\ j}} \right)^{P_j} \right]^r \quad (76)$$

3) Availability due to collocated VMs interferences. When components fail due to a fault in the physical hardware, or in the host operating system, or in the hypervisor then AMF cannot identify the source of the failure, the faulty entity, it is not even aware of the fact that the node on which it manages the components are VMs deployed on physical hosts, but potentially collocated. AMF will failover services provided by components of the other VMs residing on that physical host. AMF considers these failures to be independent and therefore the recovery action is taken per VM. However these failures are dependent (e.g. due to physical hardware fault) and physical hardware reboot could solve this issue, but AMF performs VM failovers independently.

To handle this issue, it is assumed that the same escalation is applied for the VMs as for the components. When the maximum number of permitted VM failovers or VM reboot is reached within a time period, physical hardware reboot is performed. As a result, a service is affected when any of the collocated VMs trigger a reboot of the physical host it is hosted on. If N represents the number of component types in an SU, $p_j$ denotes the number of components of a component type, r+1 is the total number of SUs in a VM and s is the number of collocated VMs in a physical host then, Equation (77) is used to calculate $A_{collocatedVM's\ interference}$. Note that $MTTF_{int\ of\ SUs}$ and the $MTTR_{int\ of\ SUs}$ is calculated using Equations (74) and (75) respectively. Note that if there are no collocated VMs in a physical host, then the availability due to collocated VMs interference is one.

$$A_{collocated\ VMs\ in\ a\ ph's\ interference} = \quad (77)$$

$$\left[ \left( \prod_{j=1}^{j \leq N} \left( \frac{MTTF_{int\ of\ SUs\ j}}{MTTF_{int\ of\ SUs\ j} + MTTR_{int\ of\ SUs\ j}} \right)^{P_j} \right)^{r+1} \right]^s$$

From (73), (76) and (77), $$A_{collocated\ entities} = \begin{pmatrix} A_{collocated\ components\ in\ a\ SU's\ interference} * \\ A_{collocated\ SUs\ in\ a\ vm's\ interference} * \\ A_{collocated\ VMs\ in\ a\ ph's\ interference} \end{pmatrix} \quad (78)$$

Finally, substituting Equations (44), (45) and (78) in Equation (42) results in the estimated availability of an SI.

The method disclosed herein uses AMF as middleware to manage the availability of the services provided by the VNFs. The disclosed method generates AMF configurations for VNFs. The concepts in the NFV domain are mapped to the concepts in the AMF domain and a VNFC is designed by grouping one or more AMF component types to provide the service type. Next, the number of AMF entities and also the number of VNFCIs are determined to meet the requested availability and to deploy the VNFCIs of a VNFC using minimum number of physical hosts.

The configuration and deployment of VNFs in the NFVI are based on the information about the number of VNFCIs, their collocation/anti-collocation relationship and the VM flavor. This information is reflected in the AMF configuration and can be extracted to design a VNF configuration. More specifically, the calculated number of VMs represents the required number of VNFCIs, the number of VM groups denotes the number of anti-affinity VM groups in the NFVI, and the number of VMs in the VM groups represents the number of VNFCIs with anti-affinity relation between them. Also, the VM flavor that is used to instantiate the VNFCI can also be obtained from the AMF configuration. Finally, the determined number of physical hosts can be used to deploy the VNFCIs of a VNFC.

Figure 8:
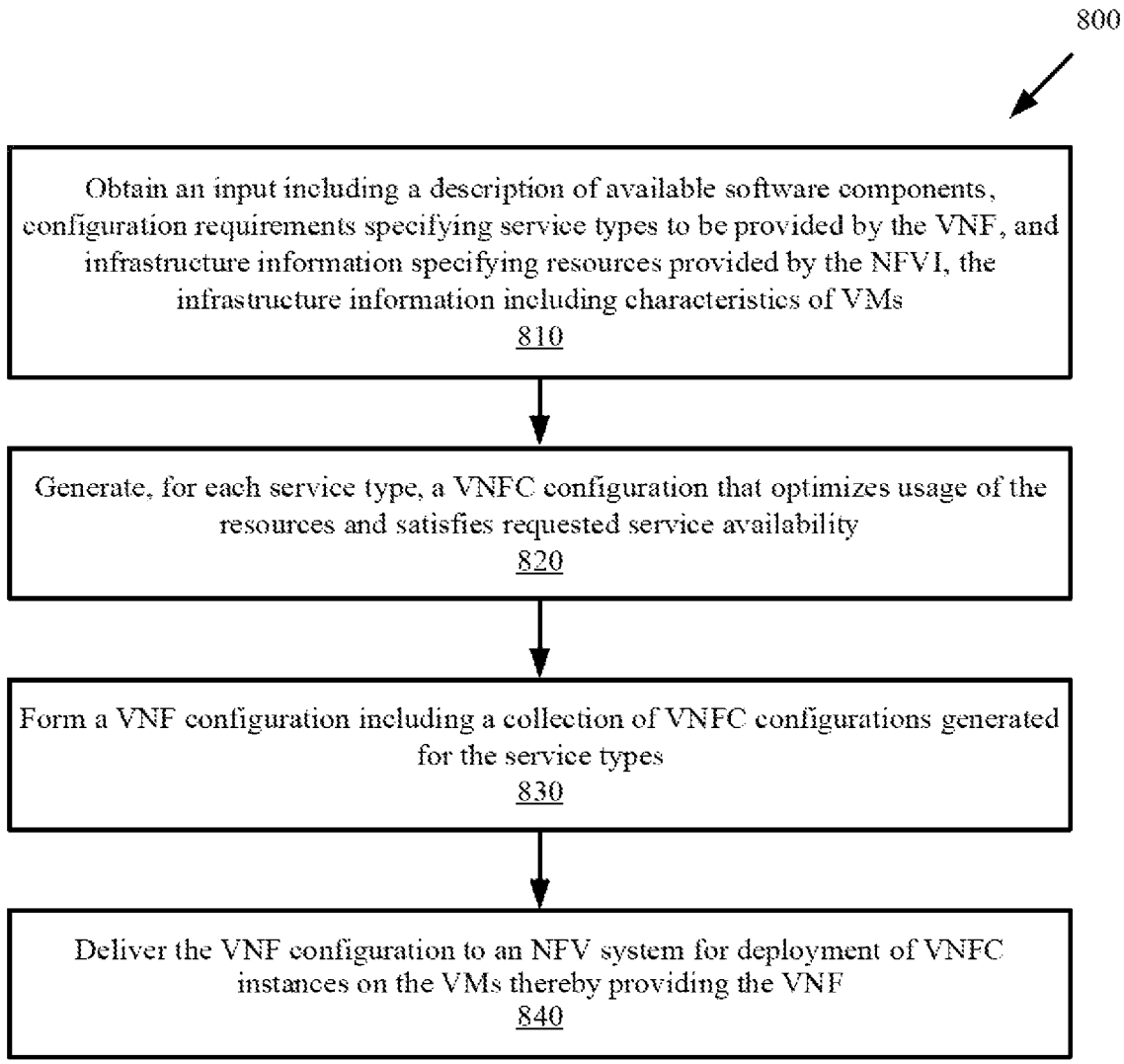
FIG. 8 is a flow diagram illustrating a method for providing a VNF for deployment in a virtualization infrastructure according to one embodiment.

FIG. 8 is a flow diagram illustrating a method 800 for providing a VNF for deployment in an NFVI. In some embodiments, the method 800 may be performed by a system such as any of the embodiments shown in FIG. 9, 10 or 11. The method 800 begins at step 810 when a system obtains an input including a description of available software components, configuration requirements specifying service types to be provided by the VNF, and infrastructure information specifying resources provided by the NFVI. The infrastructure information includes characteristics of VMs s. According to the input, the system generates at step 820, for each service type, a VNFC configuration that optimizes usage of the resources and satisfies requested service availability. The system at step 830 forms a VNF configuration including a collection of VNFC configurations generated for the service types. The system at step 840 delivers the VNF configuration to an NFV system for the deployment of the VNFC instances on the VMs thereby providing the VNF.

Figure 9:
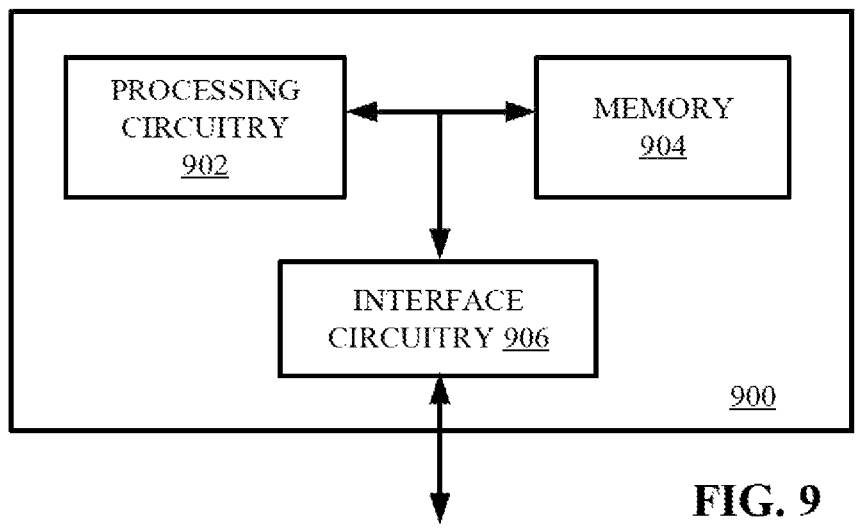
FIG. 9 is a block diagram of a network node according to one embodiment.

FIG. 9 is a block diagram illustrating a network node 900 according to an embodiment. In one embodiment, the network node 900 may be a server in an operator network or in a data center. The network node 900 includes circuitry which further includes processing circuitry 902, a memory or instruction repository 904 and interface circuitry 906. The interface circuitry 906 can include at least one input port and at least one output port. The memory 904 contains instructions executable by the processing circuitry 902 whereby the network node 900 is operable to perform the various embodiments as described herein for generating a VNF configuration.

Figure 10:
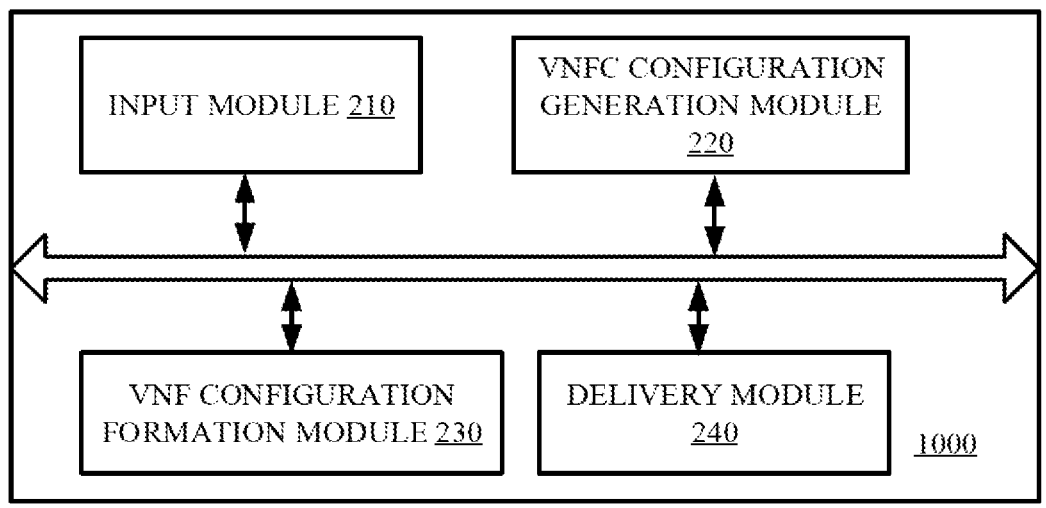
FIG. 10 is a block diagram of another network node according to one embodiment.

FIG. 10 is a block diagram of an example network node 1000 that includes a plurality of modules. In one embodiment, the network node 1000 may be a server in an operator network or in a data center, and each of the modules may be general-purpose or special-purpose circuitry adapted or operative to perform the following functions. Referring also to FIG. 2, the network node 1000 includes the input module 210, the VNFC configuration generation module 220, the VNF configuration formation module 230, and the delivery module 240. The network node 1000 can be configured to perform the various embodiments as have been described herein.

Figure 11:
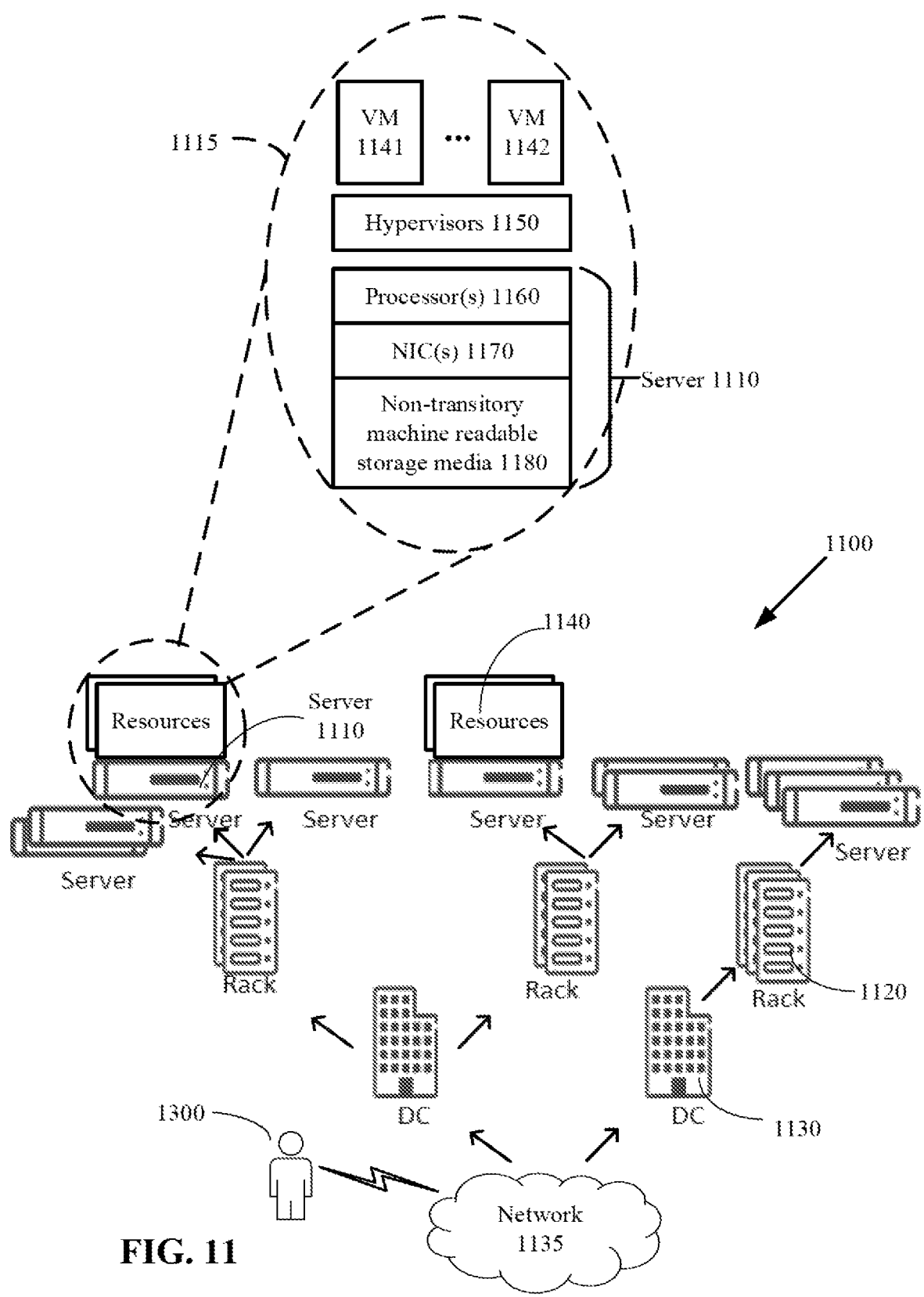
FIG. 11 is an architectural overview of a cloud computing environment according to one embodiment.

FIG. 11 is an architectural overview of a cloud computing environment 1100 that comprises a hierarchy of a cloud computing entities. The cloud computing environment 1100 can include a number of different data centers (DCs) 1130 at different geographic sites connected over a network 1135. Each data center 1130 site comprises a number of racks 1120, each rack 1120 comprises a number of servers 1110. It is understood that in alternative embodiments a cloud computing environment may include any number of data centers, racks and servers. A set of the servers 1110 may be selected to host resources 1140. In one embodiment, the servers 1110 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container herein refers to a software component that can contain other components within itself. Multiple containers can share the same operating system (OS) instance, and each container provides an isolated execution environment for its contained component. As opposed to virtual machines (VMs), containers and their contained components share the same host OS instance and therefore create less overhead.

Further details of the server 1110 and its resources 1140 are shown within a dotted circle 1115 of FIG. 11, according to one embodiment. The cloud computing environment 1100 comprises a general-purpose network device (e.g. server 1110), which includes hardware comprising a set of one or more processor(s) 1160, which can be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, as well as non-transitory machine readable storage media 1180 having stored therein software and/or instructions executable by the processor(s) 1160.

During operation, the processor(s) 1160 execute the software to instantiate a hypervisor 1150 and one or more VMs 1141, 1142 that are run by the hypervisor 1150. The hypervisor 1150 and VMs 1141, 1142 are virtual resources, which may run node instances in this embodiment. In one embodiment, the node instance may be implemented on one or more of the VMs 1141, 1142 that run on the hypervisor 1150 to perform the various embodiments as have been described herein. In one embodiment, the node instance may be instantiated as a network node performing the various embodiments as described herein.

In an embodiment, the node instance instantiation can be initiated by a user 1300 or by a machine in different manners. For example, the user 1300 can input a command, e.g., by clicking a button, through a user interface to initiate the instantiation of the node instance. The user 1300 can alternatively type a command on a command line or on another similar interface. The user 1300 can otherwise provide instructions through a user interface or by email, messaging or phone to a network or cloud administrator, to initiate the instantiation of the node instance.

Embodiments may be represented as a software product stored in a machine-readable medium (such as the non-transitory machine readable storage media 1180, also referred to as a computer-readable medium, a processor-readable medium, or a computer usable medium having a computer readable program code embodied therein). The non-transitory machine-readable medium 1180 may be any suitable tangible medium including a magnetic, optical, or electrical storage medium including a diskette, compact disk read only memory (CD-ROM), digital versatile disc read only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

Abbreviations.

| | |
|---|---|
| Act cap per CST | Active capability of components per CST |
| Act proportion | Proportion of active SUs in an SG |
| AGM | Available guest memory |
| APM | Available physical memory |
| CF | Clean up failure |
| CFIWD | Clean up action failing while attempting to instantiate a component with delay |
| CFIWOD | Clean up action failing while attempting to instantiate a component without delay |
| Clt | Time required to perform clean up action for a component |
| CR | Configuration requirements |
| CSS | Time required to set HA assignment for a component |
| ct | Component type |
| EA | Estimated availability |
| ETF | Entity type file |
| GOSM | Memory used by guest OS from infrastructure file |
| HA | High availability |
| HM | Memory used by hypervisor from infrastructure file |
| HOSM | Memory used by host OS from infrastructure file |
| IF | Instantiation failure |

-continued

| | |
|---|---|
| K | Minimum number of redundant entities |
| Max | Maximum number of SIs per VM |
| Max no of comps per CT | Maximum number of components per CT based on the SU type |
| Max no of SIs per act SU | Maximum number of active SIs per SU |
| Max no of SIs per SG | Maximum number of SIs protected by an SG |
| Max no of SIs per std SU | Maximum number of standby SIs per SU |
| Max no of VMs per PH | Maximum number of VMs per physical host based on capacity or SIs |
| Memory required per CSI | Memory required by one component to provide a CSI |
| Memory required per CST | Memory required by collaborating components to provide all CSIs of a CST |
| Memory required per SI | Memory required by all collaborating components to provide an active SI assignment |
| Min | Minimum number of SIs per VM |
| Min no of comps per CT | Minimum number of components required per component type |
| MTTF | Mean time to failure |
| MTTR | Mean time to repair |
| NFV | Network function virtualization |
| NFVI | Network function virtualization infrastructure |
| NFV-MANO | Network function virtualization Management and Orchestration |
| nia | Number of instantiation attempts |
| NIWD | Number of instantiation attempts with delay |
| NIWOD | Number of instantiation attempts without delay |
| No of act SUs | Number of active SUs |
| No of coll comps per CT | Number of collocated components per component type in an SU |
| No of coll SUs | Number of collocated SUs in a VM |
| No of coll VMs | Number of collocated VMs in a PH |
| No of comps per CT | Number of components per CT in an SU |
| No of comps per SU | Total number of components in an SU |
| No of CSIs per CST | Number of CSIs per CST in an SI |
| No of PHs | Number of physical hosts |
| No of SGs | Number of SGs |
| No of SIs | Number of SIs from CR |
| No of SIs per PH | Number of SIs per physical host |
| No of SIs per SU | Number of SIs provided by an SU |
| No of SIs per VM | Number of SIs provided by an SUs hosted in a VM |
| No of std SUs | Number of standby SUs |
| No of SUs per SG | Number of redundant SUs per SG |
| No of SUs per VM | Number of SUs hosted per VM |
| No of VM groups | Number of AMF node groups or anti-affinity VM groups |
| No of VMs | Total number of VMs to deploy all SIs |
| No of VMs per PH | Number of VMs per physical host based on the capacity of a physical host |
| NS | Network service |
| NST | Node shut down time |
| OBF | Overbooking factor from the infrastructure provider |
| PCNS | Probability of clean up not successful |
| PCS | Probability of clean up successful |
| PH | Physical host |
| RA | Requested availability from CR |
| Set of actual rec of CTs | A set having actual recovery of components of an SU |
| Set of min no of comps | A set having minimum number of components determined for each CT |
| Set of SGs | A set having SGs determined for each CT |
| SOT | Switch over time |
| std cap per CST | Standby capability of components per CST |
| Std proportion | Proportion of standby SUs in an SG |
| SUT | Service unit type |
| TGM | Total guest memory |
| TPM | Total physical host's memory from infrastructure file |
| VM | Virtual machine |
| VNF | Virtualized network function |
| VNFC | Virtualized network function component |
| VNFCI | Virtualized network function component instance |

What is claimed is:

1. A method for providing a Virtual Network Function (VNF) for deployment in a Network Function Virtualization (NFV) system, comprising:
obtaining configuration requirements comprising a plurality of service types to be provided by the VNF and corresponding requested availabilities and capacities;
for each of a plurality of service types:
selecting a type stack of a plurality of type stacks associated with the service type, the type stack satisfying the configuration requirements, wherein the type stack is a combination of prototypes that together provide a functionality of the service type;
configuring the type stack for a plurality of VM flavors that can provide a requested capacity, a capacity of the each VM flavor being determined as a maximum number service instances (SIs) per physical host that satisfies a requested availability;
selecting a smallest VM flavor of the plurality of VM flavors, that has a maximum number of SIs per physical hosts;
generating a VNF component (VNFC) configuration for each service type using the type stack and the smallest VM flavor, the VNFC configuration defining a minimum number of physical hosts that can provide a number of VMs that can provide the requested capacity;
forming a VNF configuration including the VNFC configurations generated for the plurality of service types; and
delivering the VNF configuration to the NFV system for the deployment of VNFC instances, thereby providing the VNF.

2. The method of claim 1, wherein a maximum number service instances (SIs) per physical host is determined by:
estimating availability of an SI based on failure rates of hosting entities, hosted entities and interferences of collocated entities.

3. The method of claim 1, wherein a maximum number service instances (SIs) per physical host is determined by:
determining a range defined by a theoretical minimum number of SIs and a theoretical maximum number of SIs that a VM provides based on a VM capacity specified in infrastructure information; and
estimating availability of an SI when a given number of SIs within the range are collocated on the VM.

4. The method of claim 3, further comprising:
based on a result of comparing the estimated availability of an SI with a requested availability of an SI, reducing the range and updating the given number of SIs within the range accordingly; and
repeating the estimating, the reducing and the updating until the estimated availability matches the requested availability.

5. The method of claim 1, further comprising:
creating, for each VM flavor, entities that satisfy the requested availability.

6. A network node comprising:
processing circuitry; and
memory containing instructions executable by the processing circuitry to provide a Virtual Network Function (VNF) for deployment in a Network Function Virtualization (NFV) system,
the network node operative to:
obtain configuration requirements comprising a plurality of service types to be provided by the VNF and corresponding requested availabilities and capacities;
for each of a plurality of service types:
select a type stack of a plurality of type stacks associated with the service type, the type stack satisfying the configuration requirements, wherein the type stack is a combination of prototypes that together provide a functionality of the service type;
configure the type stack for a plurality of VM flavors that can provide a requested capacity, a capacity of the each VM flavor being determined as a maximum number service instances (SIs) per physical host that satisfies a requested availability;
select a smallest VM flavor of the plurality of VM flavors, that has a maximum number of SIs per physical hosts;
generate a VNF component (VNFC) configuration for each service type using the type stack and the smallest VM flavor, the VNFC configuration defining a minimum number of physical hosts that can provide a number of VMs that can provide the requested capacity;
form a VNF configuration including the VNFC configurations generated for the plurality of service types; and
deliver the VNF configuration to the NFV system for the deployment of VNFC instances, thereby providing the VNF.

7. The network node of claim 6, wherein the network node is further operative to estimate availability of an SI based on failure rates of hosting entities, hosted entities and interferences of collocated entities.

8. The network node of claim 6, wherein the network node is further operative to:
determine a range defined by a theoretical minimum number of SIs and a theoretical maximum number of SIs that a VM provides based on a VM capacity specified in infrastructure information; and
estimate availability of an SI when a given number of SIs within the range are collocated on the VM.

9. The network node of claim 8, wherein the network node is further operative to:
based on a result of comparing the estimated availability of an SI with a requested availability of an SI, reduce the range and update the given number of SIs within the range accordingly; and
repeat the estimating, the reducing and the updating until the estimated availability matches the requested availability.

10. The network node of claim 6, wherein the network node is further operative to:
create, for each VM flavor, entities that satisfy the requested availability.

* * * * *